US011631027B2

(12) United States Patent
Fu et al.

(10) Patent No.: US 11,631,027 B2
(45) Date of Patent: Apr. 18, 2023

(54) SYSTEMS AND METHODS FOR ALLOCATING SERVICE REQUESTS

(71) Applicant: BEIJING DIDI INFINITY TECHNOLOGY AND DEVELOPMENT CO., LTD., Beijing (CN)

(72) Inventors: Junqiang Fu, Beijing (CN); Xianyue Zeng, Beijing (CN); Yangbiao Liu, Beijing (CN); Zang Li, Beijing (CN)

(73) Assignee: BEIJING INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 1149 days.

(21) Appl. No.: 16/232,044

(22) Filed: Dec. 25, 2018

(65) Prior Publication Data

US 2019/0130301 A1    May 2, 2019

Related U.S. Application Data

(63) Continuation of application No. PCT/CN2018/091534, filed on Jun. 15, 2018.

(30) Foreign Application Priority Data

Jun. 16, 2017  (CN) .......................... 201710457389.6
Jun. 16, 2017  (CN) .......................... 201710458654.2

(51) Int. Cl.
*G06N 20/00*     (2019.01)
*G06Q 10/06*     (2012.01)
(Continued)

(52) U.S. Cl.
CPC .............. *G06N 20/00* (2019.01); *G06N 5/04* (2013.01); *G06Q 10/06* (2013.01); *G06Q 10/063* (2013.01);
(Continued)

(58) Field of Classification Search
CPC ........... G06Q 10/00–50/00; G06N 1/00–20/00
(Continued)

(56) References Cited

U.S. PATENT DOCUMENTS 9,939,279 B2 *   4/2018   Pan ................... G01C 21/3438
10,552,773 B1 *  2/2020   Shah ...................... G06N 20/00
(Continued)

FOREIGN PATENT DOCUMENTS

CN    101355714 A     1/2009
CN    103325046 A     9/2013
(Continued)

OTHER PUBLICATIONS

Zhang, Yinan, Research and Implementation of the Intelligent Matching Problem on Shared-Ride Taxi, China Master's Theses Full-text Database, Engineering Science and Technology Series II, 2015, 57 pages.
(Continued)

*Primary Examiner* — Alan S Miller
(74) *Attorney, Agent, or Firm* — Metis IP LLC

(57) ABSTRACT

The present disclosure relates to systems and methods for providing Online-to-Offline services. The method may include obtain first information associated with a first service request having been allocated to a service provider and having been accepted by the service provider. The method may also include obtaining second information associated with a second service request initiated via an application executed by a second requester terminal. The method may also include determining a matching parameter based on the first information and the second information by using at least one trained matching model and determining whether the matching parameter is larger than a threshold. The method may also include transmitting data associated with the
(Continued)

second service request based on a result of the determination that the matching parameter is larger than the threshold.

18 Claims, 20 Drawing Sheets

(51) Int. Cl.
| | |
|---|---|
| *G06Q 50/10* | (2012.01) |
| *G06Q 10/08* | (2012.01) |
| *G06Q 50/30* | (2012.01) |
| *G06N 5/04* | (2006.01) |
| *G06Q 30/06* | (2012.01) |
| *G06Q 10/063* | (2023.01) |
| *G06Q 10/0835* | (2023.01) |
| *G06Q 10/083* | (2023.01) |
| *G06Q 10/0631* | (2023.01) |
| *G06Q 30/0601* | (2023.01) |

(52) U.S. Cl.
 CPC ... *G06Q 10/06311* (2013.01); *G06Q 10/0838* (2013.01); *G06Q 10/08355* (2013.01); *G06Q 30/0635* (2013.01); *G06Q 50/10* (2013.01); *G06Q 50/30* (2013.01)

(58) Field of Classification Search
 USPC .............................. 706/1–900; 705/7.11–7.42
 See application file for complete search history.

(56) References Cited

U.S. PATENT DOCUMENTS

| | | | | |
|---|---|---|---|---|
| 10,679,390 | B1* | 6/2020 | Solgi | G06N 5/022 |
| 2003/0177020 | A1 | 9/2003 | Okamura | |
| 2010/0153279 | A1* | 6/2010 | Zahn | G06Q 10/025 |
| | | | | 705/5 |
| 2010/0280884 | A1 | 11/2010 | Levine et al. | |
| 2011/0099040 | A1* | 4/2011 | Felt | H04W 4/025 |
| | | | | 715/764 |
| 2011/0137741 | A1 | 6/2011 | Omer et al. | |
| 2011/0153629 | A1* | 6/2011 | Lehmann | G06Q 30/06 |
| | | | | 707/E17.014 |
| 2011/0184977 | A1 | 7/2011 | Du et al. | |
| 2012/0041675 | A1* | 2/2012 | Juliver | G06Q 10/08 |
| | | | | 701/465 |
| 2013/0132246 | A1 | 5/2013 | Amin et al. | |
| 2015/0161554 | A1* | 6/2015 | Sweeney | G06Q 50/30 |
| | | | | 705/7.15 |
| 2015/0254581 | A1* | 9/2015 | Brahme | G06Q 10/02 |
| | | | | 705/5 |
| 2016/0034845 | A1* | 2/2016 | Hiyama | G06Q 30/0633 |
| | | | | 705/7.15 |
| 2016/0138928 | A1* | 5/2016 | Guo | G01C 21/3438 |
| | | | | 701/537 |
| 2016/0364823 | A1 | 12/2016 | Cao | |
| 2017/0138749 | A1* | 5/2017 | Pan | G01C 21/3438 |
| 2017/0227370 | A1* | 8/2017 | O'Mahony | G06Q 10/02 |
| 2017/0227371 | A1* | 8/2017 | O'Mahony | G08G 1/096811 |
| 2018/0115598 | A1* | 4/2018 | Shariat | G06N 20/00 |
| 2018/0341880 | A1* | 11/2018 | Kislovskiy | G06Q 50/30 |
| 2020/0082314 | A1* | 3/2020 | Crapis | G06Q 10/06311 |

FOREIGN PATENT DOCUMENTS

| | | |
|---|---|---|
| CN | 104599002 A | 5/2015 |
| CN | 105117777 A | 12/2015 |
| CN | 105868915 A | 8/2016 |
| CN | 105894359 A | 8/2016 |
| CN | 106803197 A | 6/2017 |
| WO | 2010125499 A1 | 11/2010 |
| WO | 2014074407 A1 | 5/2014 |
| WO | 2017088828 A1 | 6/2017 |

OTHER PUBLICATIONS

International Search Report in PCT/CN2018/091534 dated Sep. 20, 2018, 4 Pages.
Written Opinion in PCT/CN2018/091534 dated Sep. 20, 2018, 4 Pages.
The Extended European Search Report in European Application No. 18815095.7 dated Feb. 12, 2019, 8 Pages.
Notice of Reasons for Rejection in Japanese Application No. 2018-566885 dated Jul. 21, 2020, 7 pages.
First Office Action in Chinese Application No. 201710457389.6 dated Aug. 4, 2020, 21 pages.
First Office Action in Chinese Application No. 201710458654.2 dated May 13, 2020, 17 pages.
First Office Action in Chinese Application No. 201880002585.7 dated May 8, 2020, 10 pages.

* cited by examiner

500

Obtaining target information, wherein the target information includes provider information of a service provider, first information associated with a first service request that has been accepted by the service provider, second information associated with a second service request to be allocated, and real-time information — 510

Obtaining feature information based on the target information — 520

Inputting the feature information into a trained model — 530

Obtaining a matching parameter determined by the trained target model — 540

Determining that the second service request matches with the service provider based on a result of the determination that the matching parameter is larger than or equal to a preset threshold — 550

Allocating the second service request to the service provider — 560

```
┌─────────────────────────────────────────────────────┐
│ Obtaining target information, wherein the target    │
│ information includes provider information of a      │      1010
│ service provider, first information associated with │
│ a first service request that has been accepted by   │
│ the service provider, second information associated │
│ with a second service request to be allocated, and  │
│ real-time information                               │
└─────────────────────────────────────────────────────┘
                          │
                          ▼
┌─────────────────────────────────────────────────────┐
│ Obtaining feature information based on the target   │      1020
│ information                                         │
└─────────────────────────────────────────────────────┘
                          │
                          ▼
┌─────────────────────────────────────────────────────┐
│ Inputting the feature information into a trained    │      1030
│ linear regression model and a trained deep learning │
│ model respectively                                  │
└─────────────────────────────────────────────────────┘
                          │
                          ▼
┌─────────────────────────────────────────────────────┐
│ Determining a matching parameter associated with    │
│ the first service request and the second service    │      1040
│ request by weighing a first output result           │
│ associated with the trained linear regression model │
│ and a second output result associated with the      │
│ trained deep learning model                         │
└─────────────────────────────────────────────────────┘
                          │
                          ▼
┌─────────────────────────────────────────────────────┐
│ Allocating the second service request to the        │      1050
│ service provider based on a result of the           │
│ determination that the matching parameter is larger │
│ than or equal to a preset threshold                 │
└─────────────────────────────────────────────────────┘
```

| Obtaining first information associated with a first service request, wherein the first service request has been allocated to a service provider and has been accepted by the service provider, the first service request being initiated via an application executed by a first requester terminal | 1710 |

↓

| Obtaining, via a request receiving port, second information associated with a second service request, the second service request being initiated via an application executed by a second requester terminal | 1720 |

↓

| Determining a matching parameter based on the first information and the second information by using at least one trained matching model | 1730 |

↓

| Determining whether the matching parameter is larger than a threshold | 1740 |

↓

| Transmitting, via a network, data associated with the second service request to a provider terminal associated with the service provider based on a result of the determination that the matching parameter is larger than the threshold | 1750 |

```
┌─────────────────────────────────────────────────────────┐
│ Obtaining a plurality training samples including at     │ ─── 1910
│ least one positive training sample and at least one     │
│ negative training sample                                │
└─────────────────────────────────────────────────────────┘
                           │
                           ▼
┌─────────────────────────────────────────────────────────┐
│ Extracting feature information of each of the plurality │ ─── 1920
│ of training samples                                     │
└─────────────────────────────────────────────────────────┘
                           │
                           ▼
┌─────────────────────────────────────────────────────────┐
│ Obtaining / updating at least one preliminary matching  │ ─── 1930
│ model                                                   │
└─────────────────────────────────────────────────────────┘
                           │
                           ▼
┌─────────────────────────────────────────────────────────┐
│ Determining a plurality of (updated) sample matching    │ ─── 1940
│ parameters corresponding to the plurality of training   │
│ samples based on the at least one (updated) preliminary │
│ matching model and the feature information of the       │
│ plurality of training samples                           │
└─────────────────────────────────────────────────────────┘
                           │
                           ▼
              ◇ The plurality of (updated) ◇  ─── 1950
         No  ◇ sample matching parameters  ◇
       ◄────◇ satisfy a first preset       ◇
              ◇ condition?                 ◇
                           │ Yes
                           ▼
┌─────────────────────────────────────────────────────────┐
│ Designating the at least one (updated) preliminary      │ ─── 1960
│ matching model as the at least one trained matching     │
│ model                                                   │
└─────────────────────────────────────────────────────────┘
```

FIG. 19

SYSTEMS AND METHODS FOR ALLOCATING SERVICE REQUESTS

CROSS-REFERENCE TO RELATED APPLICATIONS

This application is a continuation of International Application No. PCT/CN2018/091534 filed on Jun. 15, 2018, which designates the United States of America and claims priority to Chinese Patent Application No. 201710458654.2 filed on Jun. 16, 2017 and Chinese Patent Application No. 201710457389.6 filed on Jun. 16, 2017, the contents of which are incorporated herein by reference in their entirety.

TECHNICAL FIELD

The present disclosure generally relates to systems and methods for allocating service requests, and in particular, to systems and methods for allocating service requests based on machine learning.

BACKGROUND

With the development of Internet, a new Online-to-Offline (O2O) business model has emerged as a combination of the Internet and offline transactions. Currently, O2O service has entered a high-speed development stage, and transportation O2O service becomes a representative of successful O2O services. Take the vehicle service as an example, there are various types of vehicle services, for example, the express service, private service, ride-sharing service, chauffeur service, car rental service, and so on. In some cases, two or more service requests may share the same vehicle (e.g., carpooling). When the carpooling is provided, since the driver is required to provide services simultaneously to two or more passengers, multiple start locations and/or destinations may be involved, some problems (e.g., too much detour, low response rate) may raise from inefficient distribution of service requests, and both service efficiency and utilization of service resources may suffer. Therefore, it is desirable to provide systems and methods for distributing service requests efficiently.

SUMMARY

In one aspect of the present disclosure, a method for allocating service requests is provided. The method may include obtaining target information. The target information may include provider information of a service provider, first information associated with a first service request that has been accepted by the service provider, second information associated with a second service request to be allocated, and real-time information. The method may also include determining whether the second service request matches with the service provider by using a trained model based on the target information. The method may also include allocating the second service request to the service provider based on a result of the determination that the second service request matches with the service provider.

In some embodiments, the method may further include obtaining feature information based on the target information and inputting the feature information into the trained model. The method may also include obtaining a matching parameter determined by the trained model. The method may also include allocating the second service request to the service provider based on a result of the determination that the matching parameter is larger than or equal to a preset threshold.

In some embodiments, the method may further include extracting the first feature information directly from the target information and estimating the second feature information based on the target information.

In some embodiments, the first information associated with the first service request may include a first start location, a first destination, and a first start time, and the second information associated with the second service request may include a second start location, a second destination, and a second start time.

In some embodiments, the second feature information may include one or more of a first distance of a first original route of the first service request, a second distance of a second original route of the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance, a second ratio of the second detour distance to the second distance, a pick-up time of the second service request, a pick-up distance between a location of the service provider and the second start location of the second service request, or a third ratio of the pick-up distance to the fourth distance of the second modified route associated with the second service request.

In some embodiments, the trained model may include at least one of an extreme gradient boosting model, a linear regression model, or a deep learning network model.

In another aspect of the present disclosure, a training method for determining a trained model for allocating service requests is provided. The training method may include obtaining sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The training method may also include determining the trained model based on the sample information.

In some embodiments, the training method may further include determining a sample type of each of the plurality of historical transportation service records based on the sample information. The sample type may include a positive sample type and a negative sample type. The training method may also include determining sample feature information corresponding to each of the plurality of historical transportation service records based on the sample information. The training method may also include determining the trained model based on the sample feature information and the sample type of each of the plurality of historical transportation service records.

In some embodiments, for any of the plurality of historical transportation service records, the sample feature information may include first sample feature information and second sample feature information. The sample feature information corresponding to the historical transportation service record may be obtained based on the sample information by: extracting the first sample feature information directly from the sample information corresponding to the historical transportation service record, and estimating the second sample feature information based on the sample information corresponding to the historical transportation service record.

In some embodiments, the first historical information associated with the first historical order may include a first historical start location, a first historical destination, and a first historical start time, and the second historical information associated with the second historical order may include a second historical start location, a second historical destination, and a second historical start time.

In some embodiments, for any of the plurality of historical transportation service records, the second sample feature information may include one or more of a first historical distance of a first historical original route of the first historical order, a second historical distance of a second historical original route of the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance, a second historical ratio of the second historical detour distance to the second historical distance, a historical pick-up time of the second historical order, a historical pick-up distance between a historical location of the historical service provider and a historical second start location of the second historical order, or a third historical ratio of the historical pick-up distance to the fourth historical distance of the second historical modified route associated with the second historical order.

In some embodiments, the trained model may include at least one of an extreme gradient boosting model, a linear regression model, or a deep learning network model.

In another aspect of the present disclosure, a device for allocating service requests is provided. The device may include an obtaining module, a determination module, and an allocation module. The obtaining module may be configured to obtain target information. The target information may include provider information of a service provider, first information associated with a first service request that has been accepted by the service provider, second information associated with a second service request to be allocated, and real-time information. The determination module may be configured to determine whether the second service request matches with the service provider by using a trained model based on the target information. The allocation module may be configured to allocate the second service request to the service provider based on a result of the determination that the second service request matches with the service provider.

In some embodiments, the determination module may include a first obtaining unit, an inputting unit, a second obtaining unit, and a determination unit. The first obtaining unit may be configured to obtain feature information based on the target information. The inputting unit may be configured to input the feature information into the trained model. The second obtaining unit may be configured to obtain a matching parameter determined by the trained model. The determination unit may be configured to allocate the second service request to the service provider based on a result of the determination that the matching parameter is larger than or equal to a preset threshold.

In some embodiments, the feature information may include first feature information and second feature information. The first obtaining unit may be configured to extract the first feature information directly from the target information, and estimate the second feature information based on the target information.

In some embodiments, the first information associated with the first service request may include a first start location, a first destination, and a first start time, and the second information associated with the second service request may include a second start location, a second destination, and a second start time.

In some embodiments, the second feature information may include one or more of a first distance of a first original route of the first service request, a second distance of a second original route of the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance, a second ratio of the second detour distance to the second distance, a pick-up time of the second service request, a pick-up distance between a location of the service provider and the second start location of the second service request, or a third ratio of the pick-up distance to the fourth distance of the second modified route associated with the second service request.

In some embodiments, the trained model may include at least one of an extreme gradient boosting model, a linear regression model, or a deep learning network model.

In another aspect of the present disclosure, a training device for determining a trained model for allocating service requests is provided. The training device may include an obtaining module and a training module. The obtaining module may be configured to obtain sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The training module may be configured to determine the trained model based on the sample information.

In some embodiments, the training module may include a determination unit, an obtaining unit, and a training unit. The determination unit may be configured to determine a sample type of each of the plurality of historical transportation service records based on the sample information. The sample type may include a positive sample type and a negative sample type. The obtaining unit may be configured to determine sample feature information corresponding to each of the plurality of historical transportation service records based on the sample information. The training unit may be configured to determine the trained model based on the sample feature information and the sample type of each of the plurality of historical transportation service records.

In some embodiments, for any of the plurality of historical transportation service records, the sample feature information may include first sample feature information and second sample feature information. The obtaining unit may be configured to obtain the sample feature information corresponding to the historical transportation service record based on the sample information by: extracting the first sample feature information directly from the sample information corresponding to the historical transportation service record, and estimating the second sample feature information based on the sample information corresponding to the historical transportation service record.

In some embodiments, the first historical information associated with the first historical order may include a first historical start location, a first historical destination, and a first historical start time, and the second historical information associated with the second historical order may include a second historical start location, a second historical destination, and a second historical start time.

In some embodiments, for any of the plurality of historical transportation service records, the second sample feature information may include one or more of a first historical distance of a first historical original route of the first historical order, a second historical distance of a second historical original route of the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance, a second historical ratio of the second historical detour distance to the second historical distance, a historical pick-up time of the second historical order, a historical pick-up distance between a historical location of the historical service provider and a historical second start location of the second historical order, or a third historical ratio of the historical pick-up distance to the fourth historical distance of the second historical modified route associated with the second historical order.

In some embodiments, the trained model may include at least one of an extreme gradient boosting model, a linear regression model, or a deep learning network model.

In another aspect of the present disclosure, a computer storage medium including executable instructions is provided. The executable instructions may include obtaining target information. The target information may include provider information of a service provider, first information associated with a first service request that has been accepted by the service provider, second information associated with a second service request to be allocated and real-time information. The executable instructions may also include determining whether the second service request matches with the service provider by using a trained model based on the target information. The executable instructions may also include allocating the second service request to the service provider based on a result of the determination that the second service request matches with the service provider.

In another aspect of the present disclosure, a computer storage medium including executable instructions is provided. The executable instructions may include obtaining sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The executable instructions may also include determining the trained model based on the sample information.

In another aspect of the present disclosure, an electronic device is provided. The electronic device may include a processor suitable for executing instructions, and a storage device suitable for storing a set of instructions. The set of instructions may be suitable to be loaded by the processor. The processor may execute the set of instructions to obtain target information. The target information may include provider information of a service provider, first information associated with a first service request that has been accepted by the service provider, second information associated with a second service request to be allocated, and real-time information. The processor may also execute the set of instructions to determine whether the second service request matches with the service provider by using a trained model based on the target information. The processor may also execute the set of instructions to allocate the second service request to the service provider based on a result of the determination that the second service request matches with the service provider.

In another aspect of the present disclosure, an electronic device may include a processor suitable for executing instructions, and a storage device suitable for storing a set of instructions. The set of instructions may be suitable to be loaded by the processor. The processor may execute the set of instructions to obtain sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The processor may also execute the set of instructions to determine the trained model based on the sample information.

In another aspect of the present disclosure, a method for allocating service requests is provided. The method may include obtaining target information. The target information may include provider information of a service provider, first information associated with a first service request that has been accepted by the service provider, second information associated with a second service request to be allocated, and real-time information. The method may also include obtaining feature information based on the target information. The method may also include inputting the feature information into a trained linear regression model and a trained deep learning model respectively. The method may also include determining a matching parameter associated with the first service request and the second service request by weighing a first output result associated with the trained linear regression model and a second output result associated with the trained deep learning model. The method may also include allocating the second service request to the service provider based on a result of the determination that the matching parameter is larger than or equal to a preset threshold.

In some embodiments, the method may include obtaining initial feature information of an identity category and initial feature information of a non-identity category based on the target information. The method may also include determining the feature information by modifying the initial feature information of the identity category and the initial feature information of the non-identity category.

In some embodiments, the feature information may include first feature information, second feature information, and third feature information. The method may also include determining the first feature information by inputting the initial feature information of the non-identity category into a trained integration model and normalizing an output result associated with the trained integration model. The method may also include determining the second feature information by normalizing the initial feature information of the non-identity category, and determining the third feature information by discretizing and normalizing the initial feature information of the identity category.

In some embodiments, the first information associated with the first service request may include a first start location, a first destination, and a first start time, and the second information associated with the second service request may include a second start location, a second destination, and a second start time.

In another aspect of the present disclosure, a training method for determining a trained model for allocating service requests is provided. The training method may include obtaining sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The training method may also include determining a sample type of each of the plurality of historical transportation service records. The sample type may include a positive sample type and a negative sample type. The training method may also include determining sample feature information corresponding to each of the plurality of historical transportation service records based on the sample information. The training method may also include determining a trained linear regression model and a trained deep learning model by adjusting at least one parameter associated with a preliminary linear regression model and a preliminary deep learning model based on the sample feature information and the sample type of each of the plurality of historical transportation service records.

In some embodiments, for each of the plurality of historical transportation service records, the training method may include inputting the sample feature information into the preliminary linear regression model and the preliminary deep learning model. The method may also include determining a reference matching parameter by weighing a first sample output result associated with the preliminary linear regression model and a second sample output result associated with the preliminary deep learning model. The method may also include adjusting the at least one parameter based on the reference matching parameter and the sample type of each of the plurality of historical transportation service records.

In some embodiments, for any of the plurality of historical transportation service records, the sample feature information corresponding to the historical transportation service record may be obtained based on the sample information by: obtaining initial sample feature information of an identity category and initial sample feature information of a non-identity category based on the relevant information corresponding to the historical transportation record in the sample information, and determining the sample feature information by modifying the initial sample feature information of the identity category and the initial sample feature information of the non-identity category.

In some embodiments, the sample information may include first sample feature information, second sample feature information and third sample feature information. The training method may further include determining the first sample feature information by inputting the initial sample feature information of the non-identity category into a trained integration model and normalizing a sample output result associated with the trained integration model. The training method may also include determining the second sample feature information by normalizing the initial sample feature information of the non-identity category. The training method may also include determining the third sample feature information by discretizing and normalizing the initial sample feature information of the identity category.

In some embodiments, the method may further include determining the trained integration model based on the sample type of each of the plurality of historical transportation service records and the initial sample feature information of the non-identity category of each of the plurality of historical transportation service records.

In some embodiments, the first historical information associated with the first historical order may include a first historical start location, a first historical destination, and a first historical start time, and the second historical information associated with the second historical order may include a second historical start location, a second historical destination, and a second historical start time.

In another aspect of the present disclosure, a device for allocating service requests is provided. The device may include a first obtaining module, a second obtaining module, an inputting module, an outputting module, and an allocation module. The first obtaining module may be configured to obtain target information. The target information may include provider information of a service provider, first information associated with a first service request that has been accepted by the service provider, second information associated with a second service request to be allocated, and real-time information. The second obtaining module may be configured to obtain feature information based on the target information. The inputting module may be configured to input the feature information into a trained linear regression model and a trained deep learning model respectively. The outputting module may be configured to determine a matching parameter associated with the first service request and the second service request by weighing a first output result associated with the trained linear regression model and a second output result associated with the trained deep learning model. The allocation module may be configured to allocate the second service request to the service provider based on a result of the determination that the matching parameter is larger than or equal to a preset threshold.

In some embodiments, the second obtaining module may include an obtaining unit and a processing unit. The obtaining unit may be configured to obtain initial feature information of an identity category and initial feature information of a non-identity category based on the target information. The processing unit may be configured to determine the feature information by modifying the initial feature information of the identity category and the initial feature information of the non-identity category.

In some embodiments, the feature information may include first feature information, second feature information, and third feature information. The processing unit may be further configured to determine the first feature information by inputting the initial feature information of the non-identity category into a trained integration model and normalizing an output result associated with the trained integration model. The processing unit may also configured to determine the second feature information by normalizing the initial feature information of the non-identity category. The processing unit may also be configured to determine the third feature information by discretizing and normalizing the initial feature information of the identity category.

In some embodiments, the first information associated with the first service request may include a first start location, a first destination, and a first start time, and the second information associated with the second service request may include a second start location, a second destination, and a second start time.

In another aspect of the present disclosure, a training device for determining a trained model for allocating service requests is provided. The training device may include a first obtaining module, a determination module, a second obtaining module, and an adjustment module. The first obtaining module may be configured to obtain sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The determination module may be configured to determine a sample type of each of the plurality of historical transportation service records. The sample type may include a positive sample type and a negative sample type. The second obtaining module may be configured to determine sample feature information corresponding to each of the plurality of historical transportation service records based on the sample information. The adjustment module may be configured to determine a trained linear regression model and a trained deep learning model by adjusting at least one parameter associated with a preliminary linear regression model and a preliminary deep learning model based on the sample feature information and the sample type of each of the plurality of historical transportation service records.

In some embodiments, for each of the plurality of historical transportation service records, the adjustment module may be configured to input the sample feature information into the preliminary linear regression model and the preliminary deep learning model. The adjusting module may also be configured to determine a reference matching parameter by weighing a first sample output result associated with the preliminary linear regression model and a second sample output result associated with the preliminary deep learning model. The adjusting module may also be configured to adjust the at least one parameter based on the reference matching parameters and the sample type of each of the plurality of historical transportation service records.

For any of the plurality of historical transportation service records, the second obtaining module may be configured to obtain the sample feature information corresponding to the historical transportation service record based on the sample information by: obtaining initial sample feature information of an identity category and initial sample feature information of a non-identity category based on the relevant information corresponding to the historical transportation record in the sample information, and determining the sample feature information by modifying the initial sample feature information of the identity category and the initial sample feature information of the non-identity category.

In some embodiments, the sample information may include first sample feature information, second sample feature information, and third sample feature information. The second obtaining module may be configured to determine the sample feature information by modifying the initial sample feature information of the identity category and the initial sample feature information of the non-identity category by: determining the first sample feature information by inputting the initial sample feature information of the non-identity category into a trained integration model and normalizing a sample output result associated with the trained integration model, determining the second sample feature information by normalizing the initial sample feature information of the non-identity category, and determining the third sample feature information by discretizing and normalizing the initial sample feature information of the identity category.

In some embodiments, the training device may further include a training module. The training module may be configured to determine the trained integration model based on the sample type of each of the plurality of historical transportation service record and the initial sample feature information of the non-identity category of each of the plurality of historical transportation service records.

In some embodiments, the first historical information associated with the first historical order may include a first historical start location, a first historical destination, and a first historical start time, and the second historical information associated with the second historical order may include a second historical start location, a second historical destination, and a second historical start time.

In another aspect of the present disclosure, a computer storage medium including executable instructions. The executable instructions may include obtaining target information. The target information may include provider information of a service provider, first information associated with a first service request that has been accepted by the service provider, second information associated with a second service request to be allocated, and real-time information. The executable instructions may also include obtaining feature information based on the target information. The executable instructions may also include inputting the feature information into a trained linear regression model and a trained deep learning model respectively. The executable instructions may also include determining a matching parameter associated with the first service request and the second service request by weighing a first output result associated with the trained linear regression model and a second output result associated with the trained deep learning model. The executable instructions may also include allocating the second service request to the service provider based on a result of the determination that the matching parameter is larger than or equal to a preset threshold.

In another aspect of the present disclosure, a computer storage medium including executable instructions. The executable instructions may include obtaining sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The executable instructions may also include determining a sample type of each of the plurality of historical transportation service records. The sample type may include a positive sample type and a negative sample type. The executable instructions may include determining sample feature information corresponding to each of the plurality of historical transportation service records based on the sample information. The executable instructions may include determining a trained linear regression model and a trained deep learning model by adjusting at least one parameter associated with a preliminary linear regression model and a preliminary deep learning model based on the sample feature information and the sample type of each of the plurality of historical transportation service records.

In another aspect of the present disclosure, an electronic device is provided. The electronic device may include a processor suitable for executing instructions, and a storage device suitable for storing a set of instructions. The set of instructions may be suitable to be loaded by the processor. The processor may execute the set of instructions to obtain target information. The target information may include provider information of a service provider, first information associated with a first service request that has been accepted by the service provider, second information associated with a second service request to be allocated, and real-time information. The processor may also execute the set of instructions to obtain feature information based on the target information. The processor may also execute the set of instructions to input the feature information into a trained linear regression model and a trained deep learning model respectively. The processor may also execute the set of instructions to determine a matching parameter associated with the first service request and the second service request by weighing a first output result associated with the trained linear regression model and a second output result associated with the trained deep learning model. The processor may also execute the set of instructions to allocate the second service request to the service provider based on a result of the determination that the matching parameter is larger than or equal to a preset threshold.

In another aspect of the present disclosure, an electronic device is provided. The electronic device may include a processor suitable for executing instructions, and a storage device suitable for storing the instructions. The set of instructions may be suitable to be loaded by the processor. The processor may execute the set of instructions to obtain sample information. The sample information may include relevant information in each of a plurality of historical transportation service records. For any of the plurality of historical transportation service records, the relevant information may include historical real-time information, historical provider information associated with a historical service provider, first historical information associated with a first historical order that was accepted by the historical service provider, and second historical information associated with a second historical order that was matched with the first historical order and allocated to the historical service provider. The processor may also execute the set of instructions to may determine a sample type of each of the plurality of historical transportation service records. The sample type may include a positive sample type and a negative sample type. The processor may also execute the set of instructions to determine sample feature information corresponding to each of the plurality of historical transportation service records based on the sample information. The processor may also execute the set of instructions to determine a trained linear regression model and a trained deep learning model by adjusting at least one parameter associated with a preliminary linear regression model and a preliminary deep learning model based on the sample feature information and the sample type of each of the plurality of historical transportation service records.

In another aspect of the present disclosure, a system configured to provide Online-to-Offline services is provided. The system may include at least one storage device including a set of instructions, at least one processor in communication with the at least one storage device. When executing the set of instructions, the at least one processor may be configured to cause the system to obtain first information associated with a first service request. The first service request may have been allocated to a service provider and have been accepted by the service provider. The first service request may be initiated via an application executed by a first requester terminal. The at least one processor may also be configured to cause the system to obtain, via a request receiving port, second information associated with a second service request. The second service request may be initiated via an application executed by a second requester terminal. The at least one processor may also be configured to determine a matching parameter based on the first information and the second information by using at least one trained matching model. The at least one processor may also be configured to determine whether the matching parameter is larger than a threshold. The at least one processor may also be configured to transmit, via a network, data associated with the second service request to a provider terminal associated with the service provider based on a result of the determination that the matching parameter is larger than the threshold. The provider terminal, in response to receiving the data associated with the second service request, may display at least portion of the received data associated with the second service request in a graphic user interface.

In some embodiments, the at least one processor may further be configured to cause the system to obtain reference information associated with the service provider from a data resource via the network. The reference information may include at least one of provider information associated with the service provider, weather information, time information, or traffic information. The at least one processor may also be configured to cause the system to determine the matching parameter based on the first information, the second information, and the reference information by using the at least one trained matching model.

In some embodiments, the first information may include at least one of a first start location of the first service request, a first destination of the first service request, or a first start time of the first service request; and the second information may include at least one of a second start location of the second service request, a second destination of the second service request, or a second start time of the second service request.

In some embodiments, the at least one trained matching model may include a first trained matching model and a second trained matching model. The at least one processor is configured to cause the system further to determine a first matching parameter based on the first information and the second information by using the first trained matching model. The at least one processor is also configured to cause the system to determine a second matching parameter based on the first information and the second information by using the second trained matching model. The at least one processor is also configured to cause the system to determine the matching parameter based on the first matching parameter and the second matching parameter.

In some embodiments, the at least one trained matching model may be trained by the at least one processor based on a training process. The training process may include obtaining a plurality training samples including at least one positive training sample and at least one negative training sample. The training process may also include extracting feature information of each of the plurality of training samples. The training process may also include determining the at least one trained matching model based on the feature information of the plurality of training samples In some embodiments, obtaining the at least one positive training sample and the at least one negative training sample may include: obtaining a historical transportation service record, wherein the historical transportation service record includes first historical information associated with a first historical order that was accepted by a historical service provider, second historical information associated with a second historical order that was matched with the first historical order, or historical reference information associated with the historical service provider; determining a positive training sample based on the historical transportation service record based on a result of the determination that the second historical order was accepted by the historical service provider; and determining a negative training sample based on the historical transportation service record based on a result of the determination that the second historical order was not accepted by the historical service provider.

In some embodiments, the first historical information may include at least one of a first historical start location of the first historical order, a first historical destination of the first historical order, or a first historical start time of the first historical order; and the second historical information may include at least one of a second historical start location of the second historical order, a second historical destination of the second historical order, or a second historical start time of the second historical order.

In some embodiments, determining the at least one trained matching model based on the plurality of training samples may include: obtaining at least one preliminary matching model; determining a plurality of sample matching parameters corresponding to the plurality of training samples based on the at least one preliminary matching model and the feature information of the plurality of training samples; determining whether the plurality of sample matching parameters satisfy a first preset condition; and designating the at least one preliminary matching model as the at least one trained matching model based on a result of the determination that the plurality of sample matching parameters satisfy the first preset condition.

In some embodiments, determining the at least one trained matching model based on the plurality of training samples may include: updating the at least one preliminary matching model based on a result of the determination that the plurality of sample matching parameters fail to satisfy the first preset condition.

In some embodiments, the at least one trained matching model may include a first trained matching model and a second trained matching model, and determining the at least one trained matching model based on the plurality of training samples includes: obtaining a first preliminary matching model and a second preliminary matching model; determining a plurality of first sample matching parameters corresponding to the plurality of training samples based on the first preliminary matching model and the feature information of the plurality of training samples; determining a plurality of second sample matching parameters corresponding to the plurality of training samples based on the second preliminary matching model and the feature information of the plurality of training samples; determining whether a sample result associated with the plurality of first sample matching parameters and the plurality of second sample matching parameters satisfies a second preset condition; and respectively designating the first preliminary matching model and the second preliminary matching model as the first trained matching model and the second trained matching model based on a result of the determination that the sample result satisfies the second preset condition.

In some embodiments, determining the at least one trained matching model based on the plurality of training samples may include: updating at least one of the first preliminary matching model and the second preliminary matching model based on a result of the determination that the sample result fails to satisfy the second preset condition.

In some embodiments, the feature information of the each of the plurality of training samples may include first feature information of the each of the plurality of training samples, second feature information of the each of the plurality of training samples, and third feature information of the each of the plurality of training samples, and determining the feature information of each of the plurality of training samples may include: extracting initial feature information of the each of the plurality of training samples, the initial feature information including first initial feature information of a non-identity category and second initial feature information of an identity category; and determining the feature information of the each of the plurality of training samples by modifying the initial feature information.

In some embodiments, determining the feature information of the each of the plurality of training samples by modifying the initial feature information may include: determining a first feature result based on a trained integration model and the first initial feature information; and determining the first feature information of the each of the plurality of training samples by normalizing the first feature result.

In some embodiments, determining the feature information of the each of the plurality of training samples by modifying the initial feature information may include determining the second feature information of the each of the plurality of training samples by normalizing the first initial feature information.

In some embodiments, determining the feature information of the each of the plurality of training samples by modifying the initial feature information may include: discretizing the second initial feature information; and determining the third feature information of the each of the plurality of training samples by normalizing the discretized second initial feature information.

In some embodiments, the at least one trained matching model may include an extreme gradient boosting model, a linear regression model, or a deep learning network model.

In another aspect of the present disclosure, a method is provided. The method may be implemented on a computing device having at least processor, at least one storage device, and a communication platform connected to a network. The method may include obtaining first information associated with a first service request. The first service request may have been allocated to a service provider and have been accepted by the service provider. The first service request may be initiated via an application executed by a first requester terminal. The method may also include obtaining, via a request receiving port, second information associated with a second service request. The second service request may be initiated via an application executed by a second requester terminal. The method may also include determining a matching parameter based on the first information and the second information by using at least one trained matching model. The method may also include determining whether the matching parameter is larger than a threshold. The method may also include transmitting, via a network, data associated with the second service request to a provider terminal associated with the service provider based on a result of the determination that the matching parameter is larger than the threshold. The provider terminal, in response to receiving the data associated with the second service request, may display at least portion of the received data associated with the second service request in a graphic user interface.

In another aspect of the present disclosure, a non-transitory computer readable medium is provided. The non-transitory computer readable medium may include executable instructions that, when executed by at least one processor, directs the at least one processor to perform a method. The method may include obtaining first information associated with a first service request. The first service request may have been allocated to a service provider and have been accepted by the service provider, the first service request may be initiated via an application executed by a first requester terminal. The method may also include obtaining, via a request receiving port, second information associated with a second service request. The second service request may be initiated via an application executed by a second requester terminal. The method may also include determining a matching parameter based on the first information and the second information by using at least one trained matching model. The method may also include determining whether the matching parameter is larger than a threshold. The method may also include transmitting, via a network, data associated with the second service request to a provider terminal associated with the service provider based on a result of the determination that the matching parameter is larger than the threshold. The provider terminal, in response to receiving the data associated with the second service request, may display at least portion of the received data associated with the second service request in a graphic user interface.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for allocating service requests according to some embodiments of the present disclosure;

FIG. 10 is a flowchart illustrating an exemplary process for allocating service requests according to some embodiments of the present disclosure;

FIG. 17 is a flowchart illustrating an exemplary process for allocating service requests to a service provider according to some embodiments of the present disclosure;

FIG. 19 is a flowchart illustrating an exemplary process for determining at least one trained matching model for allocating service requests according to some embodiments of the present disclosure.

DETAILED DESCRIPTION

Figure 1:
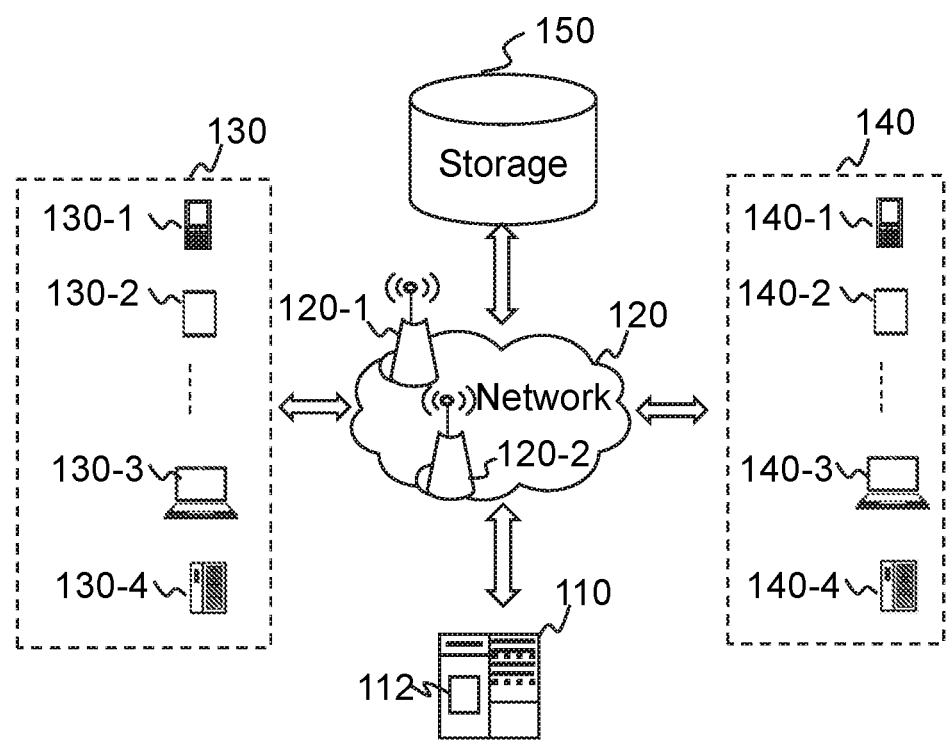
FIG. 1 is a schematic diagram illustrating an exemplary on-demand service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to some embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding on-demand service, it should also be understood that this is only one exemplary embodiment. The systems and methods of the present disclosure may be applied to any other kind of on-demand service. For example, the systems and methods of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the systems and methods of the present disclosure may include a webpage, a plug-in of a browser, a client terminal, a custom system, an internal analysis system, an artificial intelligence robot, or the like, or any combination thereof.

The terms "passenger," "requester," "requestor," "service requester," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure refers to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for Online-to-Offline services (e.g., a transportation carpooling service). For example, a system may obtain the information associated with a first service request that has been accepted by a service provider. The system may also obtain the information associated with a second service request to be allocated and the reference information (e.g., provider information of the service provider, traffic information, weather information). The system may further determine a matching score of the first service request and the second service request by using at least one trained matching model based on the information associated with the first service request, the information associated with the second service request, and the reference information. Further, the system may determine whether the matching score is larger than a threshold, and the system may allocate the second service request to the service provider in response to the determination that the matching score is larger than the threshold. The at least one trained matching model may be trained based on a plurality of historical transportation service records. According to the at least one trained matching model, the system can allocate service requests associated with carpooling services efficiently.

It should be noted that online on-demand service, such as online taxi-hailing services, is a new form of service rooted only in post-Internet era. It provides technical solutions to users and service providers that could raise only in post-Internet era. In the pre-Internet era, when a passenger hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the on-demand service system may provide a much more efficient transaction platform for the users and the service providers that may never meet in a traditional pre-Internet on-demand service system.

FIG. 1 is a schematic diagram illustrating an exemplary on-demand service system according to some embodiments of the present disclosure. In some embodiments, the on-demand service system may be a system for Online-to-Offline services. For example, the on-demand service system 100 may be a platform for transportation services such as taxi hailing, chauffeur services, delivery vehicles, express car, carpool, bus service, driver hiring, and shuttle services. The on-demand service system 100 may include a server 110, a network 120, a requester terminal 130, a provider terminal 140, and a storage 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may be directly connected to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2.

In some embodiments, the server 110 may include a processing engine 112. The processing engine 112 may process information and/or data relating to a service request to perform one or more functions described in the present disclosure. For example, the processing engine 112 may determine a matching parameter by using at least one trained matching model based on first information associated with a first service request and second information associated with a second service request. The matching parameter may indicate a matching degree associated with the second service request and a service provider that has accepted the first service request. In some embodiments, the processing engine 112 may include one or more processing engines (e.g., single-core processing engine(s) or multi-core processor(s)). The processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requester terminal 130, the provider terminal 140, or the storage 150) may transmit information and/or data to another component(s) of the on-demand service system 100 via the network 120. For example, the server 110 may obtain a service request from the requester terminal 130 via the network 120. In some embodiments, the network 120 may be any type of wired or wireless network, or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to send a service request for a user B or receive a service confirmation and/or information or instructions from the server 110. In some embodiments, a service provider may be a user of the provider terminal 140. In some embodiments, the user of the provider terminal 140 may be someone other than the service provider. For example, a user C of the provider terminal 140 may use the provider terminal 140 to receive a service request for a user D, and/or information or instructions from the server 110.

In some embodiments, the requester terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include an onboard computer, an onboard television, etc. In some embodiments, the requester terminal 130 may be a device with positioning technology for locating the location of the service requester and/or the requester terminal 130.

In some embodiments, the provider terminal 140 may be similar to, or the same device as the requester terminal 130. In some embodiments, the provider terminal 140 may be a device with positioning technology for locating the location of the service provider and/or the provider terminal 140. In some embodiments, the requester terminal 130 and/or the provider terminal 140 may communicate with another positioning device to determine the location of the service requester, the requester terminal 130, the service provider, and/or the provider terminal 140. In some embodiments, the requester terminal 130 and/or the provider terminal 140 may send positioning information to the server 110.

The storage 150 may store data and/or instructions relating to the service request. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requester terminal 130, the provider terminal 140). One or more components of the on-demand service system 100 may access the data and/or instructions stored in the storage 150 via the network 120. In some embodiments, the storage 150 may be directly connected to or communicate with one or more components of the on-demand service system 100 (e.g., the server 110, the requester terminal 130, the provider terminal 140). In some embodiments, the storage 150 may be part of the server 110.

In some embodiments, one or more components of the on-demand service system 100 (e.g., the server 110, the requester terminal 130, the provider terminal 140) may have permissions to access the storage 150. In some embodiments, one or more components of the on-demand service system 100 may read and/or modify information relating to the service requester, the service provider, and/or the public when one or more conditions are met. For example, the server 110 may read and/or modify one or more service requesters' information after a service is completed. As another example, the provider terminal 140 may access information relating to the service requester when receiving a service request from the requester terminal 130, but the provider terminal 140 may not modify the relevant information of the service requester.

In some embodiments, information exchanging of one or more components of the on-demand service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element (or component) of the on-demand service system 100 performs, the element may perform through electrical signals and/or electromagnetic signals. For example, when the requester terminal 130 transmits out a service request to the server 110, a processor of the requester terminal 130 may generate an electrical signal encoding the request. The processor of the requester terminal 130 may then transmit the electrical signal to an output port. If the requester terminal 130 communicates with the server 110 via a wired network, the output port may be physically connected to a cable, which further may transmit the electrical signal to an input port of the server 110. If the requester terminal 130 communicates with the server 110 via a wireless network, the output port of the requester terminal 130 may be one or more antennas, which convert the electrical signal to electromagnetic signal. Similarly, the provider terminal 140 may process a task through operation of logic circuits in its processor, and receive an instruction and/or a service request from the server 110 via electrical signals or electromagnet signals. Within an electronic device, such as the requester terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium (e.g., the storage 150), it may transmit out electrical signals to a read/write device of the storage medium, which may read or write structured data in the storage medium. The structured data may be transmitted to the processor in the form of electrical signals via a bus of the electronic device. Here, an electrical signal refers to one electrical signal, a series of electrical signals, and/or a plurality of discrete electrical signals.

Figure 2:
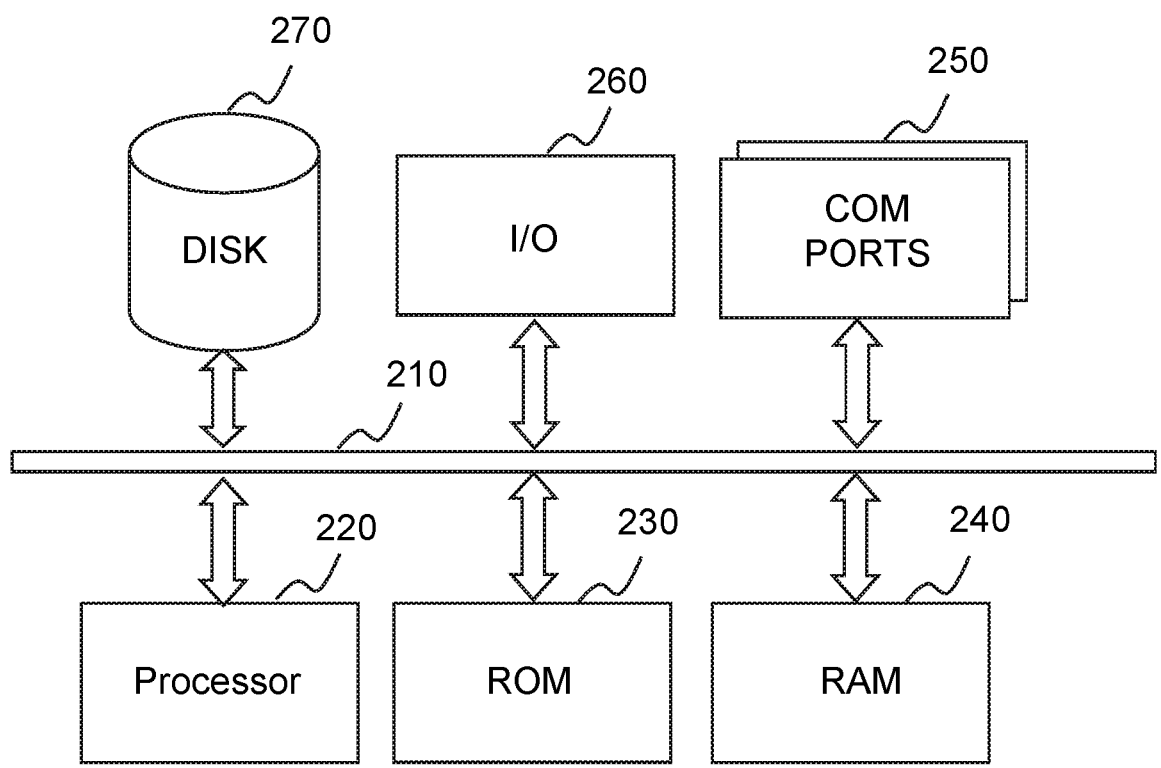
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. In some embodiments, the server 110, the requester terminal 130, and/or the provider terminal 140 may be implemented on the computing device 200. For example, the processing engine 112 may be implemented on the computing device 200 and configured to perform functions of the processing engine 112 disclosed in this disclosure.

The computing device 200 may be used to implement any component of the on-demand service system 100 as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
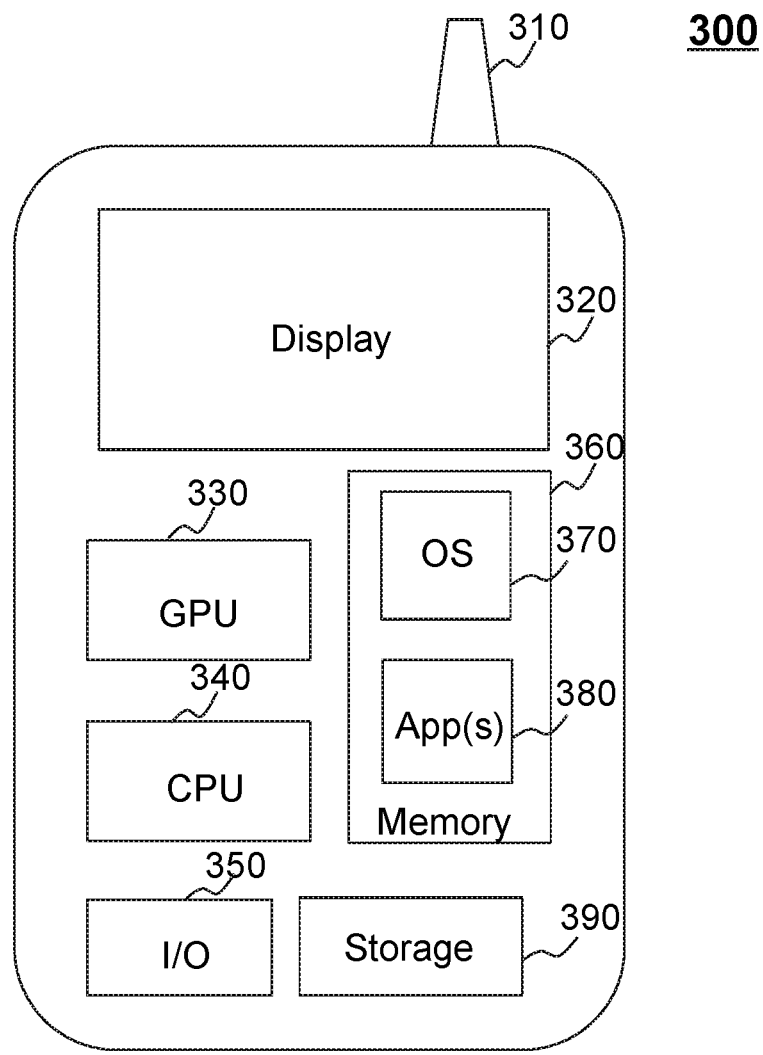
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the requester terminal 130 or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to on-demand services or other information from the on-demand service system 100. User interactions with the information stream may be achieved via the I/O 350 and provided to the processing engine 112 and/or other components of the on-demand service system 100 via the network 120.

Figure 4:
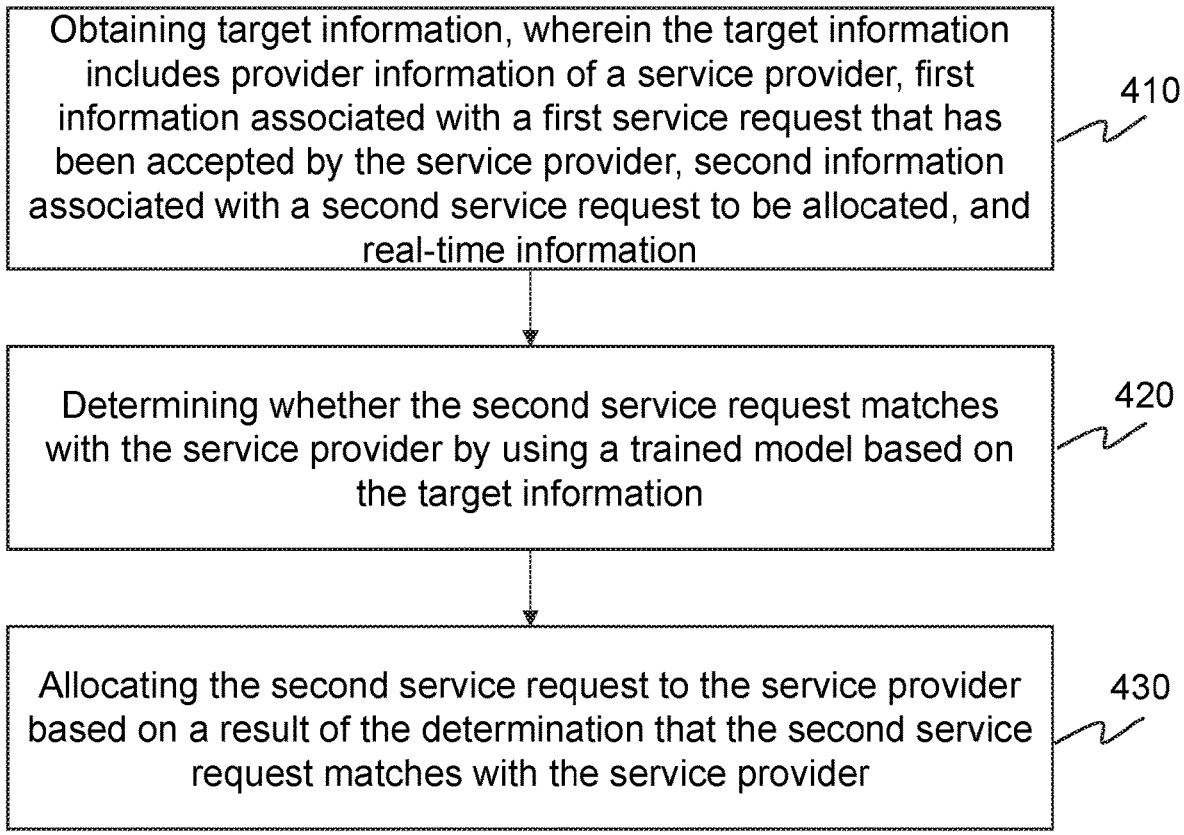
FIG. 4 is a flowchart illustrating an exemplary process for allocating service requests according to some embodiments of the present disclosure.

FIG. 4 is a flowchart illustrating an exemplary process for allocating service requests according to some embodiments of the present disclosure. In some embodiments, the process 400 may be implemented as a set of instructions (e.g., an application) stored in the storage ROM 230 or RAM 240.

Figure 8:
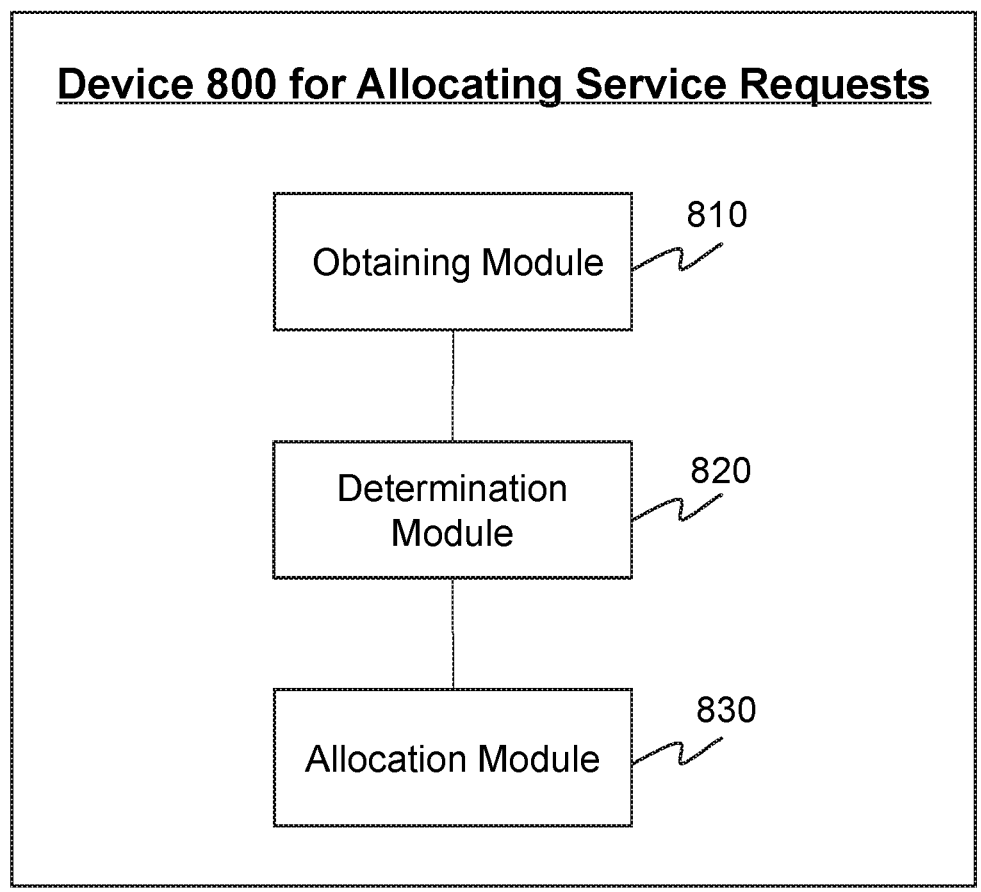
FIG. 8 is a block diagram illustrating an exemplary device for allocating service requests according to some embodiments of the present disclosure.

The processor 220 and/or modules in FIG. 8 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed. Additionally, the order in which the operations of the process as illustrated in FIG. 4 and described below is not intended to be limiting.

In 410, target information may be obtained. The target information may include provider information of a service provider, first information associated with a first service request that has been accepted by the service provider, second information associated with a second service request to be allocated, and real-time information. The provider information and the real-time information may be collectively referred to as the reference information.

In some embodiments, a service associated with the service request (e.g., the first service request, the second service request) may be a ride-sharing service associated with a vehicle (e.g., a carpooling service). An application scenario of the present disclosure may be a scenario in which a service provider who provides the ride-sharing service has accepted a service request and is waiting to be allocated another service request. For example, for a carpooling service, the service provider may be a driver that picks up passengers. The first service request may be a service request that has been accepted by the service provider. The second service request may be a service request to be allocated.

In some embodiments, the provider information of the service provider may include various kinds of information that can represent personal characteristics of the service provider. Take a carpooling service as an example, the service provider may be a driver that provides the carpooling service. The provider information may include but not limited to identity (ID) information of the driver, gender information of the driver, age information of the driver, service score information of the driver, star information of the driver, vehicle type information of the driver, current location information of the driver, etc.

In some embodiments, the first information associated with the first service request may include various kinds of information included in the first service request. For example, the first information associated with the first service request may include but not limited to a first start location, a first destination, a first start time, first user information associated with a first user of the first service request, etc. The second information associated with the second service request may include various kinds of information included in the second service request. For example, the second information may include but not limited to a second start location, a second destination, a second start time, second user information associated with a second user of the second service request, etc. As used herein, the user information may include but not limited to ID information of the user, portrait information (e.g., gender information, age information, hobby information, occupation information) of the user, etc. The start time (e.g., the first start time, the second start time) used herein refers to a time point when a user (e.g., the first user, the second user) wishes to start off.

In some embodiments, the real-time information may include but not limited to current weather information, current time information (e.g., time point information, week information, Gregorian date information, lunar date information, holiday information), current traffic information, etc.

In 420, whether the second service request matches with the service provider (i.e., whether the second service request matches with the first service request that has been accepted by the service provider) may be determined by using a trained model based on the target information.

The trained model may include any one of an extreme gradient boosting (XGBoost) model, a linear regression model, or a deep neural network (DNN) model. It should be understood that the trained model may include trained models of other types. The description of the types of the trained model in the present disclosure is not intended to be limiting.

In some embodiments, whether the second service request matches with the service provider may be determined by using the trained model based on the target information according to the following process. The feature information may be obtained based on the target information. The feature information may be entered the trained model as the input. The matching parameter determined by the trained model may be obtained as the output of the trained model. The on-demand system 100 may determine that the second service request matches with the service provider based on a result of the determination that the matching parameter is larger than or equal to a preset threshold.

In 430, the second service request may be allocated to the service provider based on a result of the determination that the second service request matches with the service provider.

A process for allocating service requests is provided in the above embodiments of the present disclosure. The target information may be obtained. Whether the second service request matches with the service provider may be determined by using the trained model based on the target information. The second service request may be allocated to the service provider based on a result of the determination that the second service request matches with the service provider. As used herein, the target information may include the provider information of the service provider, the first information associated with the first service request that has been accepted by the service provider, the second information associated with the second service request to be allocated, and the real-time information. According to the process, the matching between the second service request and the service provider may be more reasonable, and the service efficiency and the utilization of service resources may be improved.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 5 is a flowchart illustrating an exemplary process for allocating service requests according to some embodiments of the present disclosure. In some embodiments, the process 500 may be implemented as a set of instructions (e.g., an application) stored in the storage ROM 230 or RAM 240. The processor 220 and/or modules in FIG. 8 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, target information may be obtained. The target information may include provider information of a service provider, first information associated with a first service request that has been accepted by the service provider, second information associated with a second service request to be allocated, and real-time information.

In 520, feature information may be obtained based on the target information. In some embodiments, the feature information may include first feature information (also referred to as "first initial feature information") and second feature information (also referred to as "second initial feature information"). The first feature information may be obtained directly based on the target information. The second feature information may be estimated based on the target information. Specifically, the first feature information may be extracted directly from the target information. The second feature information may be estimated based on the target information according to, for example, a preset algorithm, a preset strategy, or a preset model.

In some embodiments, the first feature information may include one or more of: gender information of the service provider, age information of the service provider, service score information of the service provider, star information of the service provider, vehicle type information of the service provider, current location information of the service provider, weather information, or time information.

In some embodiments, the second feature information may include one or more of: a first distance of a first original route of the first service request, a second distance of a second original route of the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance, a second ratio of the second detour distance to the second distance, a pick-up time of the second service request, a pick-up distance between a location of the service provider and the second start location of the second service request, or a third ratio of the pick-up distance to the fourth distance of the second modified route associated with the second service request.

As used herein, an original route (e.g., the first original route, the second original route) refers to a recommended route from a start location (e.g., the first start location, the second start location) of a service request (e.g., the first service request, the second service request) to a destination (e.g., the first destination, the second destination) of the service request. A modified route (e.g., the first modified route, the second modified route) refers to a route from a start location (e.g., the first start location, the second start location) of a service request (e.g., the first service request, the second service request) to a destination (e.g., the first destination, the second destination) of the service request when the service provider provides a carpooling service associated with the service request. The combined route refers to a route of the carpooling service provided by the service provider. A detour distance (e.g., the first detour distance, the second detour distance) refers to a difference between a distance of the modified route and a distance of the original route. A detour time (e.g., the first detour time, the second detour time) refers to a time difference between an estimated time of the modified route and an estimated time of the original route.

In 530, the feature information may be entered the trained model as the input.

In 540, a matching parameter may be obtained based on the trained model. In some embodiments, the feature information may be entered the trained model as the input, and the matching parameter determined by the trained model may be obtained as the output of the trained model. The matching parameter may indicate a matching degree between the second service request and the service provider. The on-demand system 100 may determine that the second service request matches with the service provider if the matching parameter is larger than or equal to a preset threshold.

In 550, it may be determined that the second service request matches with the service provider if the matching parameter is larger than or equal to the preset threshold.

In 560, the second service request may be allocated to the service provider.

It should be noted that for operations which are similar to some operations of the process 400, the descriptions may not be repeated in FIG. 5. More detailed descriptions of the similar operations may be found in some embodiments illustrated in FIG. 4.

A process for allocating service requests is provided in the above embodiments of the present disclosure. The target information may be obtained. The feature information may be obtained based on the target information. The feature information may be entered the trained model as the input. The matching parameter determined by the trained model may be obtained as the output of the trained model. If the matching parameter is larger than or equal to the preset threshold, it may be determined that the second service request matches with the service provider and the second service request may be allocated to the service provider. According to the process, the matching between the second service request and the service provider may be more reasonable, and the utilization of service resources may be improved.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
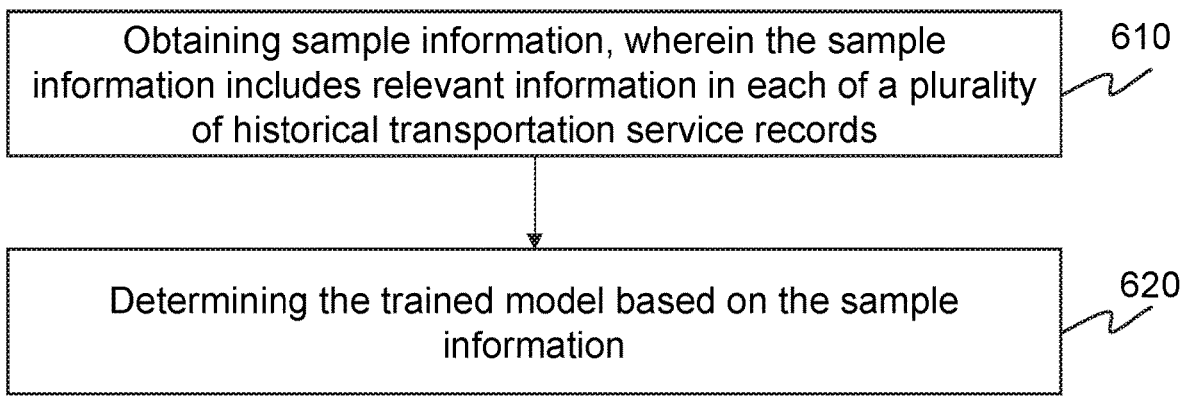
FIG. 6 is a flowchart illustrating an exemplary training process for determining a trained model for allocating service requests according to some embodiment of the present disclosure.

FIG. 6 is a flowchart illustrating an exemplary training process for determining a trained model for allocating service requests according to some embodiment of the present disclosure. In some embodiments, the process 600 may be implemented as a set of instructions (e.g., an application) stored in the storage ROM 230 or RAM 240. The processor 220 and/or modules in FIG. 9 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed.

Additionally, the order in which the operations of the process as illustrated in FIG. 6 and described below is not intended to be limiting.

In 610, sample information may be obtained. The sample information may include relevant information in each of a plurality of historical transportation service records. The historical transportation service records may be obtained from a storage device (e.g., the storage 150) disclosed elsewhere in the present disclosure. The historical transportation service records may be historical transportation service records within a predetermined period (e.g., last month, last three months, last year).

In some embodiments, for any of the plurality of historical transportation service records, the relevant information may include historical real-time information, historical provider information of a historical service provider, first historical information associated with a first historical order that was accepted by the historical service provider, and second historical information associated with a second historical order that was matched with the first historical order and allocated to the historical service provider. The historical provider information of the historical service provider and the historical real-time information may be collectively referred to as historical reference information.

In some embodiments, the historical provider information of the historical service provider may include various kinds of information that may represent personal characteristics of the historical service provider. Take a historical carpooling service as an example, the historical service provider may be a historical driver that provided the historical carpooling service. The historical provider information of the historical service provider may include but not limited to ID information of the historical driver, gender information of the historical driver, age information of the historical driver, historical service score information of the historical driver, historical star information of the historical driver, historical vehicle type information of the historical driver, historical location information of the historical driver, etc.

In some embodiments, the first historical information associated with the first historical order may include various kinds of historical information included in the first historical order. For example, the first historical information may include but not limited to a first historical start location, a first historical destination, a first historical start time, and first historical user information associated with a first historical user of the first historical order. The second historical information associated with the second historical order may include various kinds of historical information included in the second historical order. For example, the second historical information may include but not limited to a second historical start location, a second historical destination, a second start time, and second historical user information associated with a second historical user of the second historical order. As used herein, the historical user information may include but not limited to ID information of the historical user, portrait information (e.g., gender information, age information, hobby information, occupation information) of the historical user, etc.

In some embodiments, the historical real-time information may include the information that was "real time" at the time of the historical order, including, for example, historical weather information, historical time information (e.g., historical time point information, historical week information, historical Gregorian date information, historical lunar date information, historical holiday information), historical traffic information, etc.

In 620, the trained model may be determined based on the sample information. In some embodiments, the trained model may include any one of an extreme gradient boosting (XGBoost) model, a linear regression model, or a deep neural network model (DNN). It should be understood that the trained model may include trained models of other types. The description of the types of the trained model in the present disclosure is not intended to be limiting.

In some embodiments, firstly, a sample type of each of the plurality of historical transportation service records may be determined based on the sample information. The sample type may include a positive sample type and a negative sample type. Secondly, sample feature information corresponding to each of the plurality of historical transportation service records may be obtained based on the sample information. Thirdly, the trained model may be determined based on the sample feature information and the sample type of each of the plurality of historical transportation service records.

A training process for determining the trained model for allocating service requests is provided in the above embodiments of the present disclosure. The sample information may be obtained. The trained model may be determined based on the sample information. The sample information may include the relevant information in each of a plurality of historical transportation service records. According to the training process, the matching between the second service request and the service provider may be more reasonable, and the utilization of service resources may be improved.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 7:
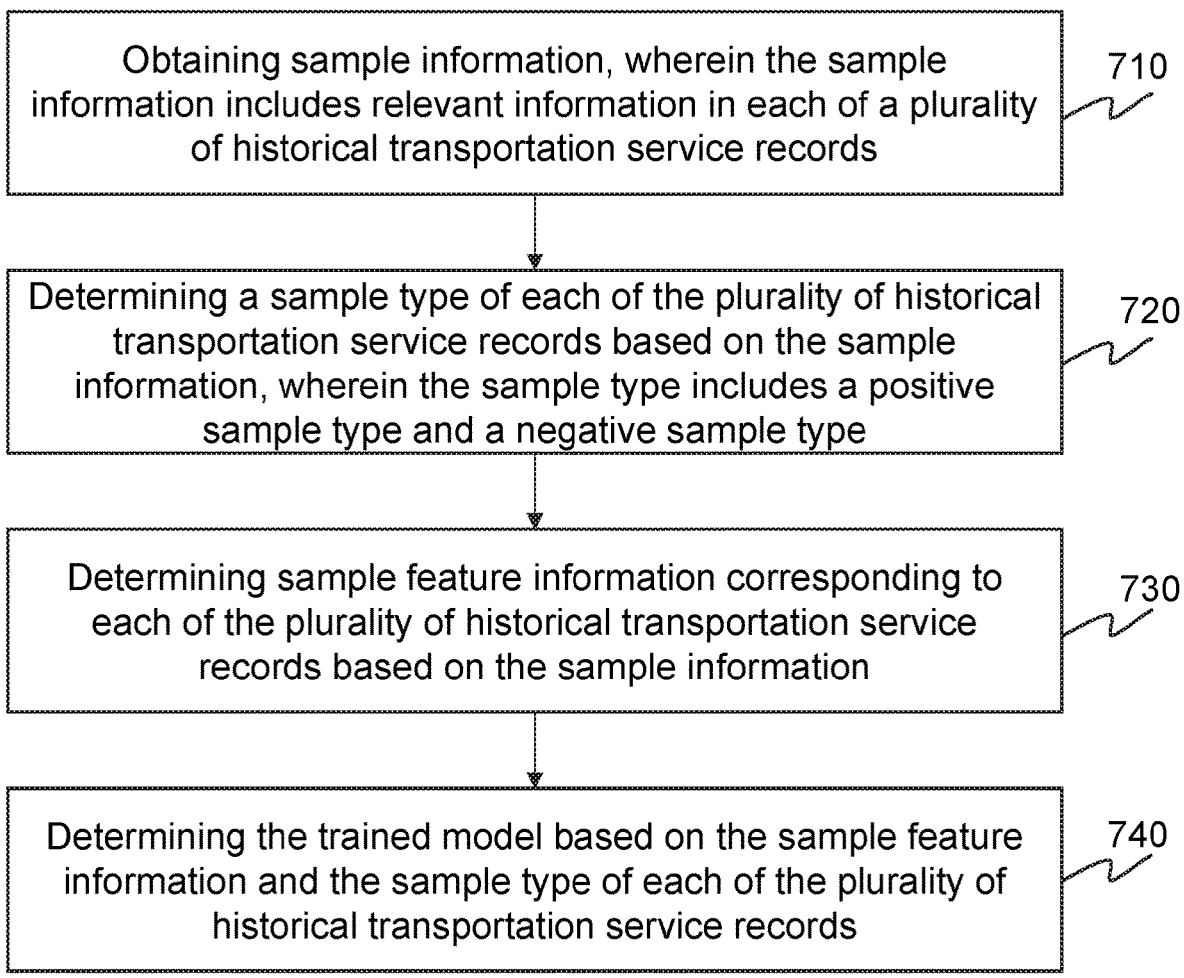
FIG. 7 is a flowchart illustrating an exemplary training process for determining a trained model for allocating service requests according to some embodiment of the present disclosure.

FIG. 7 is a flowchart illustrating an exemplary training process for determining a trained model for allocating service requests according to some embodiment of the present disclosure. In some embodiments, the process 700 may be implemented as a set of instructions (e.g., an application) stored in the storage ROM 230 or RAM 240. The processor 220 and/or modules in FIG. 9 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting.

In 710, sample information may be obtained. The sample information may include relevant information in each of a plurality of historical transportation service records.

In 720, a sample type of each of the plurality of historical transportation service records may be determined based on the sample information. The sample type may include a positive sample type and a negative sample type.

In some embodiments, the sample type of each of the plurality of historical transportation service records may be determined based on historical evaluation information and historical response information in the sample information. For example, if historical evaluation information of a historical transportation service record is relatively good or a second historical order included in a historical transportation service record was accepted by a historical service provider of the historical transportation service record, the sample type corresponding to the historical transportation service record may be determined as a positive sample type. If historical evaluation information of a historical transportation service record is relatively bad or a second historical order included in a historical transportation service record was not accepted by a historical service provider of the historical transportation service record, the sample type corresponding to the historical transportation service record may be determined as a negative sample type. As used herein, historical evaluation information refers to evaluation information (e.g., a score, a star, a comment) provided by a user (e.g., a first historical user of a first historical order included in the historical transportation service record, a second historical user of a second historical order included in the historical transportation service record). The term "good historical evaluation information" refers to that the evaluation information satisfies a first preset condition, for example, the score is larger than a threshold (e.g., 3), the star is larger than or equal to 3-star, etc. The term "bad historical evaluation information" refers to that the evaluation information satisfies a second preset condition, for example, the score is smaller than the threshold (e.g., 3), the star is less than 3-star, etc. The process for determining the positive sample type and the negative sample type in the present disclosure is not intended to be limiting.

In 730, sample feature information corresponding to each of the plurality of historical transportation service records may be determined based on the sample information.

In some embodiments, for any of the plurality of historical transportation service records, the sample feature information may include first sample feature information and second sample feature information. The first sample feature information may be obtained directly based on the sample information. The second sample feature information may be estimated based on the sample information. Specifically, the first sample feature information may be extracted directly from the sample information. The second sample feature information may be estimated based on the sample information according to, for example, a preset algorithm, a preset strategy, or a preset model.

In some embodiments, the first sample feature information may include one or more of: gender information of the historical service provider, age information of the historical service provider, historical service score information of the historical service provider, historical star information of the historical service provider, historical vehicle type information of the historical service provider, historical location information of the historical service provider, historical weather information, or historical time information.

In some embodiments, the second sample feature information may include one or more of: a first historical distance of a first historical original route associated with the first historical order, a second historical distance of a second historical original route associated with the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance of the first historical original route associated with the first historical order, a second historical ratio of the second historical detour distance to the second historical distance of the second historical original route associated with the second historical order, a historical pick-up time of the second historical order, a historical pick-up distance of the second historical order, and a third historical ratio of the historical pick-up distance to the fourth historical distance of the second historical modified route associated with the second historical order.

In 740, the trained model may be determined based on the sample feature information and the sample type of each of the plurality of historical transportation service records.

In some embodiments, the trained model may be determined based on the following process. Firstly, sample feature information associated with a dataset may be obtained. The dataset may include a training dataset and a validation dataset (the training dataset may correspond to a plurality of first historical transportation service records, and the validation dataset may correspond to a plurality of second historical transportation service records). Secondly, at least one parameter associated with a current model (e.g., a preliminary model) may be adjusted based on the sample feature information associated with the training dataset. The current model may be validated based on sample feature information associated with the validation dataset. Thirdly, the current model may be designated as the trained model until a validation result associated with the sample feature information associated with the validation dataset satisfies a condition.

The at least one parameter associated with the current model may be adjusted based on the sample feature information associated with the training dataset according to the following process. The sample feature information associated with the training dataset may be entered the current model as the input. A probability (i.e., a probability that a sample type of a historical transportation service record is a positive sample type) corresponding to each of the plurality of historical transportation service records may be obtained as the output of the current model. The probability may be designated as a reference matching parameter (also referred to as "sample matching parameter") corresponding to each of the plurality of historical transportation service records. Further, a Receiver Operating Characteristic (ROC) curve may be obtained based on a plurality of reference matching parameters and a plurality of sample types corresponding to the plurality of transportation service records. An Area Under Curve (AUC) value may be obtained based on the ROC curve. The at least one parameter associated with the current model may be adjusted based on a result of the determination that the AUC value is smaller than or equal to a preset AUC threshold. Further, the process of adjusting the at least one parameter associated with the current model may be repeated. The operation of validating the current model may be performed based on a result of the determination that the AUC value is larger than the preset AUC threshold.

The current model may be validated based on the sample feature information associated with the validation dataset according to the following process. A first AUC value may be obtained by inputting the sample feature information associated with the training dataset into the current model. A second AUC value may be obtained by inputting the sample feature information associated with the validation dataset into the current model. A difference may be obtained by subtracting the second AUC value from the first AUC value. The process of adjusting the at least one parameter associated with the current model may be repeated based on a result of the determination that an absolute value of the difference is larger than a second preset threshold. The on-demand service system 100 may determine that the validation result satisfies the condition based on a result of the determination that the absolute value of the difference is smaller than the second preset threshold.

A training process for determining the trained model for allocating service requests is provided in the above embodiments of the present disclosure. The sample information may be obtained. The sample type of each of the plurality of historical transportation service records may be determined based on the sample information. The sample information may include the relevant information in each of a plurality of historical transportation service records. The sample feature information corresponding to each of the plurality of historical transportation service records may be determined based on the sample information. The trained model may be determined based on the sample feature information and the sample type of each of the plurality of historical transportation service records. According to the training process, a trained model for allocating service requests associated with ride-sharing services may be obtained. The matching between the second service request and the service provider may be more reasonable, and the utilization of service resources may be improved.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 8 is a block diagram illustrating an exemplary device for allocating service requests according to some embodiments of the present disclosure. The device 800 may include an obtaining module 810, a determination module 820, and an allocation module 830. In some embodiments, the device 800 may be integrated into the server 110. For example, the device 800 may be part of the processing engine 112.

The obtaining module 810 may be configured to obtain target information. The target information may include provider information of a service provider, first information associated with a first service request that has been accepted by the service provider, second information associated with a second service request to be allocated, and real-time information.

In some embodiments, a service associated with the service request (e.g., the first service request, the second service request) may be a ride-sharing service associated with a vehicle (e.g., a carpooling service). An application scenario of the present disclosure may be a scenario in which a service provider who provides the ride-sharing service has accepted a service request and is waiting to be allocated another service request. For example, for a carpooling service, the service provider may be a driver that picks up passengers. The first service request may be a service request that has been accepted by the service provider. The second service request may be a service request to be allocated.

In some embodiments, the provider information of the service provider may include various kinds of information that can represent personal characteristics of the service provider. Take a carpooling service as an example, the service provider may be a driver that provides the carpooling service. The provider information may include but not limited to identity (ID) information of the driver, gender information of the driver, age information of the driver, service score information of the driver, star information of the driver, vehicle type information of the driver, current location information of the driver, etc.

In some embodiments, the first information associated with the first service request may include various kinds of information included in the first service request. For example, the first information associated with the first service request may include but not limited to a first start location, a first destination, a first start time, first user information associated with a first user of the first service request, etc. The second information associated with the second service request may include various kinds of information included in the second service request. For example, the second information may include but not limited to a second start location, a second destination, a second start time, second user information associated with a second user of the second service request, etc. As used herein, the user information may include but not limited to ID information of the user, portrait information (e.g., gender information, age information, hobby information, occupation information) of the user, etc.

In some embodiments, the real-time information may include but not limited to current weather information, current time information (e.g., time point information, week information, Gregorian date information, lunar date information, holiday information), current traffic information, etc.

The determination module 820 may be configured to determine whether the second service request matches with the service provider by using a trained model based on the target information.

In some embodiments, the trained model may be a pretrained model. The trained model may include any one of an extreme gradient boosting (XGBoost) model, a linear regression model, or a deep neural network (DNN) model. It should be understood that the trained model may include trained models of other types. The description of the types of the trained model in the present disclosure is not intended to be limiting.

In some embodiments, whether the second service request matches with the service provider may be determined by using the pretrained model based on the target information according to the following process. The feature information may be obtained based on the target information. The feature information may be entered the trained model as the input. The matching parameter determined by the trained model may be obtained as the output of the trained model. The on-demand system 100 may determine that the second service request matches with the service provider based on a result of the determination that the matching parameter is larger than or equal to a threshold.

The allocation module 830 may be configured to allocate the second service request to the service provider based on a result of the determination that the second service request matches with the service provider.

A device for allocating service requests is provided in the above embodiments of the present disclosure. The target information may be obtained. Whether the second service request matches with service provider may be determined by using the trained model based on the target information. The second service request may be allocated to the service provider based on a result of the determination that the second service request matches with the service provider. As used herein, the target information may include the provider information of the service provider, the first information associated with the first service request that has been accepted by the service provider, the second information associated with the second service request to be allocated, and the real-time information. According to the device, the matching between the second service request and the service provider may be more reasonable, and the service efficiency and the utilization of service resources may be improved.

In some alternative embodiments, the determination module 820 may include a first obtaining unit, an inputting unit, a second obtaining unit, and a determination unit (not shown in FIG. 8).

The first obtaining unit may be configured to obtain feature information based on the target information.

In some embodiments, the feature information may include first feature information (also referred to as "first initial feature information") and second feature information (also referred to as "second initial feature information"). The first feature information may be obtained directly based on the target information. The second feature information may be estimated based on the target information. Specifically, the first feature information may be extracted directly from the target information. The second feature information may be estimated based on the target information according to, for example, a preset algorithm, a preset strategy, or a preset model.

In some embodiments, the first feature information may include one or more of: gender information of the service provider, age information of the service provider, service score information of the service provider, star information of the service provider, vehicle type information of the service provider, current location information of the service provider, weather information, or time information.

In some embodiments, the second feature information may include one or more of: a first distance of a first original route of the first service request, a second distance of a second original route of the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance, a second ratio of the second detour distance to the second distance, a pick-up time of the second service request, a pick-up distance between a location of the service provider and the second start location of the second service request, or a third ratio of the pick-up distance to the fourth distance of the second modified route associated with the second service request.

The inputting unit may be configured to input the feature information into the trained model.

The second obtaining unit may be configured to obtain a matching parameter determined by the trained model.

In some embodiments, the feature information may be entered the trained model as the input, and the matching parameter determined by the trained model may be obtained as the output of the trained model. The matching parameter may indicate a matching degree between the second service request and the service provider. The on-demand system 100 may determine that the second service request matches with the service provider if the matching parameter is larger than or equal to a preset threshold.

The determination unit may be configured to allocate the second service request to the service provider based on a result of the determination that the matching parameter is larger than or equal to a preset threshold.

A device for allocating service requests is provided in the above embodiments of the present disclosure. The target information may be obtained. The feature information may be obtained based on the target information. The feature information may be entered the trained model as the input. The matching parameter determined by the trained model may be obtained as the output of the trained model. If the matching parameter is larger than or equal to the preset threshold, it may be determined that the second service request matches with the service provider and the second service request may be allocated to the service provider. According to the device, the matching between the second service request and the service provider may be more reasonable, and the utilization of service resources may be improved.

In some alternative embodiments, the feature information may include first feature information and second feature information.

The first obtaining unit may be configured to extract the first feature information directly from the target information and estimate the second feature information based on the target information.

In some alternative embodiments, the first information associated with the first service request may include a first start location, a first destination, and a first start time. The second information associated with the second service request may include a second start location, a second destination, and a second start time.

In some alternative embodiments, the second feature information may include one or more of: a first distance of a first original route of the first service request, a second distance of a second original route of the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance, a second ratio of the second detour distance to the second distance, a pick-up time of the second service request, a pick-up distance between a location of the service provider and the second start location of the second service request, or a third ratio of the pick-up distance to the fourth distance of the second modified route associated with the second service request.

In some alternative embodiments, the trained model may include at least one of an extreme gradient boosting model, a linear regression model, or a deep learning network model.

The modules in the device 800 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 9:
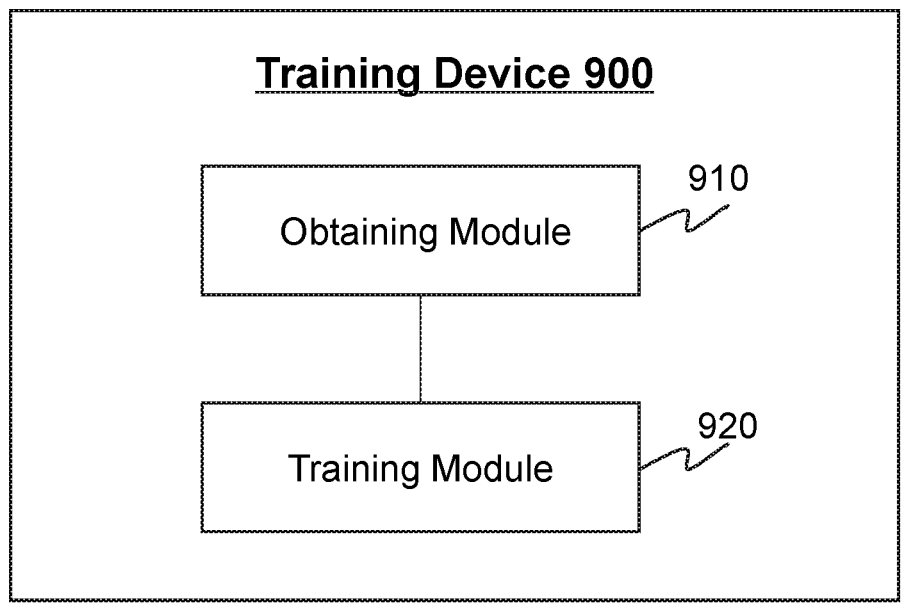
FIG. 9 is a block diagram illustrating an exemplary training device for determining a trained model for allocating service requests according to some embodiments of the present disclosure.

FIG. 9 is a block diagram illustrating an exemplary training device for determining a trained model for allocating service requests according to some embodiments of the present disclosure. The training device 900 may include an obtaining module 910 and a training module 920. In some embodiments, the training device 900 may be integrated into the server 110. For example, the training device 900 may be integrated into a component (e.g., a training module 1640) of the processing engine 112.

The obtaining module 910 may be configured to obtain sample information. The sample information may include relevant information in each of a plurality of historical transportation service records.

In some embodiments, for any of the plurality of historical transportation service records, the relevant information may include historical real-time information, historical provider information of a historical service provider, first historical information associated with a first historical order that was accepted by the historical service provider, and second historical information associated with a second historical order that was matched with the first historical order and allocated to the historical service provider. The historical provider information of the historical service provider and the historical real-time information may be collectively referred to as historical reference information.

In some embodiments, the historical provider information of the historical service provider may include various kinds of information that may represent personal characteristics of the historical service provider. Take a historical carpooling service as an example, the historical service provider may be a historical driver that provided the historical carpooling service. The historical provider information of the historical service provider may include but not limited to ID information of the historical driver, gender information of the historical driver, age information of the historical driver, historical service score information of the historical driver, historical star information of the historical driver, historical vehicle type information of the historical driver, historical location information of the historical driver, etc.

In some embodiments, the first historical information associated with the first historical order may include various kinds of historical information included in the first historical order. For example, the first historical information may include but not limited to a first historical start location, a first historical destination, a first historical start time, and first historical user information associated with a first historical user of the first historical order. The second historical information associated with the second historical order may include various kinds of historical information included in the second historical order. For example, the second historical information may include but not limited to a second historical start location, a second historical destination, a second start time, and second historical user information associated with a second historical user of the second historical order. As used herein, the historical user information may include but not limited to ID information of the historical user, portrait information (e.g., gender information, age information, hobby information, occupation information) of the historical user, etc.

In some embodiments, the historical real-time information may include the information that was "real time" at the time of the historical order, including, for example, historical weather information, historical time information (e.g., historical time point information, historical week information, historical Gregorian date information, historical lunar date information, historical holiday information), historical traffic information, etc.

The training module 920 may be configured to determine the trained model based on the sample information.

In some embodiments, the trained model may include any one of an extreme gradient boosting (XGBoost) model, a linear regression model, or a deep neural network model (DNN). It should be understood that the trained model may include trained models of other types. The description of the types of the trained model in the present disclosure is not intended to be limiting.

In some embodiments, firstly, a sample type of each of the plurality of historical transportation service records may be determined based on the sample information. The sample type may include a positive sample type and a negative sample type. Secondly, sample feature information corresponding to each of the plurality of historical transportation service records may be obtained based on the sample information. Thirdly, the trained model may be determined based on the sample feature information and the sample type of each of the plurality of historical transportation service records.

A training device for determining the trained model for allocating service requests is provided in the above embodiments of the present disclosure. The sample information may be obtained. The trained model may be determined based on the sample information. The sample information may include the relevant information in each of a plurality of historical transportation service records. According to the training device, the matching between the second service request and the service provider may be more reasonable, and the utilization of service resources may be improved.

In some alternative embodiments, the training module 920 may include a determination unit, an obtaining unit, and a training unit (not shown in FIG. 9).

The determination unit may be configured to determine a sample type of each of the plurality of historical transportation service records based on the sample information. The sample type may include a positive sample type and a negative sample type.

In some embodiments, the sample type of each of the plurality of historical transportation service records may be determined based on historical evaluation information and historical response information in the sample information. For example, if historical evaluation information of a historical transportation service record is relatively good or a second historical order included in a historical transportation service record was accepted by a historical service provider of the historical transportation service record, the sample type corresponding to the historical transportation service record may be determined as a positive sample type. If historical evaluation information of a historical transportation service record is relatively bad or a second historical order included in a historical transportation service record was not accepted by a historical service provider of the historical transportation service record, the sample type corresponding to the historical transportation service record may be determined as a negative sample type. The process for determining the positive sample type and the negative sample type in the present disclosure is not intended to be limiting.

The obtaining unit may be configured to obtain sample feature information corresponding to each of the plurality of historical transportation service records based on the sample information.

In some embodiments, for any of the plurality of historical transportation service records, the sample feature information may include first sample feature information and second sample feature information. The first sample feature information may be obtained directly based on the sample information. The second sample feature information may be estimated based on the sample information. Specifically, the first sample feature information may be extracted directly from the sample information. The second sample feature information may be estimated based on the sample information according to, for example, a preset algorithm, a preset strategy, or a preset model.

In some embodiments, the first sample feature information may include one or more of: gender information of the historical service provider, age information of the historical service provider, historical service score information of the historical service provider, historical star information of the historical service provider, historical vehicle type information of the historical service provider, historical location information of the historical service provider, historical weather information, or historical time information.

In some embodiments, the second sample feature information may include one or more of: a first historical distance of a first historical original route associated with the first historical order, a second historical distance of a second historical original route associated with the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance of the first historical original route associated with the first historical order, a second historical ratio of the second historical detour distance to the second historical distance of the second historical original route associated with the second historical order, a historical pick-up time of the second historical order, a historical pick-up distance of the second historical order, and a third historical ratio of the historical pick-up distance to the fourth historical distance of the second historical modified route associated with the second historical order.

The training unit may be configured to determine the trained model based on the sample feature information and the sample type of each of the plurality of historical transportation service records.

In some embodiments, the trained model may be determined based on the following process. Firstly, sample feature information associated with a dataset may be obtained. The dataset may include a training dataset and a validation dataset (the training dataset may correspond to a plurality of first historical transportation service records, and the validation dataset may correspond to a plurality of second historical transportation service records). Secondly, at least one parameter associated with a current model (e.g., a preliminary model) may be adjusted based on the sample feature information associated with the training dataset. The current model may be validated based on sample feature information associated with the validation dataset. Thirdly, the current model may be designated as the trained model until a validation result associated with the sample feature information associated with the validation dataset satisfies a condition.

The at least one parameter associated with the current model may be adjusted based on the sample feature information associated with the training dataset according to the following process. The sample feature information associated with the training dataset may be entered the current model as the input. A probability (i.e., a probability that a sample type of a historical transportation service record is a positive sample type) corresponding to each of the plurality of historical transportation service records may be obtained as the output of the current model. The probability may be designated as a reference matching parameter (also referred to as "sample matching parameter") corresponding to each of the plurality of historical transportation service records. Further, a Receiver Operating Characteristic (ROC) curve may be obtained based on a plurality of reference matching parameters and a plurality of sample types corresponding to the plurality of transportation service records. An Area Under Curve (AUC) value may be obtained based on the ROC curve. The at least one parameter associated with the current model may be adjusted based on a result of the determination that the AUC value is smaller than or equal to a preset AUC threshold. Further, the process of adjusting the at least one parameter associated with the current model may be repeated. The operation of validating the current model may be performed based on a result of the determination that the AUC value is larger than the preset AUC threshold.

The current model may be validated based on the sample feature information associated with the validation dataset according to the following process. A first AUC value may be obtained by inputting the sample feature information associated with the training dataset into the current model. A second AUC value may be obtained by inputting the sample feature information associated with the validation dataset into the current model. A difference may be obtained by subtracting the second AUC value from the first AUC value. The process of adjusting the at least one parameter associated with the current model may be repeated based on a result of the determination that an absolute value of the difference is larger than a second preset threshold. The on-demand service system 100 may determine that the validation result satisfies the condition based on a result of the determination that the absolute value of the difference is smaller than the second preset threshold.

A training device for determining the trained model for allocating service requests is provided in the above embodiments of the present disclosure. The sample information may be obtained. The sample type of each of the plurality of historical transportation service records may be determined based on the sample information. The sample information may include the relevant information in each of a plurality of historical transportation service records. The sample feature information corresponding to each of the plurality of historical transportation service records may be determined based on the sample feature information. The trained model may be determined based on the sample feature information and the sample type of each of the plurality of historical transportation service records. According to the training device, the matching between the second service request and the service provider may be more reasonable, and the utilization of service resources may be improved.

In some alternative embodiments, for each of the plurality of historical transportation service records, the corresponding sample feature information may include first sample feature information and second sample feature information.

The obtaining unit may be configured to obtain the sample feature information corresponding to the historical transportation service record based on the sample information by extracting the first sample feature information directly from the sample information corresponding to the historical transportation service record, and estimating the second sample feature information based on the sample information corresponding to the historical transportation service record.

In some alternative embodiments, the first historical information associated with the first historical order may include a first historical start location, a first historical destination, and a first historical start time. The second historical information associated with the second historical order may include a second historical start location, a second historical destination, and a second historical start time.

In some alternative embodiments, for any of the plurality of historical transportation service records, the second sample feature information may include one or more of: a first historical distance of a first historical original route of the first historical order, a second historical distance of a second historical original route of the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance, a second historical ratio of the second historical detour distance to the second historical distance, a historical pick-up time of the second historical order, a historical pick-up distance between a historical location of the historical service provider and a historical second start location of the second historical order, or a third historical ratio of the historical pick-up distance to the fourth historical distance of the second historical modified route associated with the second historical order.

In some alternative embodiments, the trained model may include at least one of an extreme gradient boosting model, a linear regression model, or a deep learning network model.

It should be noted that some modules described in FIG. 9 may be configured to perform other functions described in the present disclosure. For example, the obtaining module 910 may also be configured to perform the functions of the obtaining module 810, that is, the obtaining module 910 may also be configured to obtain the target information.

The modules in the training device 900 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Some embodiments of the present disclosure may take the form of a computer program product embodied in one or more computer-readable media having computer readable program code embodied thereon. For example, the computer-readable storage medium may include but not limited to disk storage, a CD-ROM, and optical memory.

The present disclosure may also provide a first computer storage medium including first instructions. When executing by at least one processor, the first instructions may direct the at least one processor to perform a process (e.g., process 400, process 500) described elsewhere in the present disclosure. The present disclosure may also provide a second computer storage medium including second instructions. When executing by at least one processor, the second instructions may direct the at least one processor to perform a process (e.g., process 600, process 700) described elsewhere in the present disclosure.

FIG. 10 is a flowchart illustrating an exemplary process for allocating service requests according to some embodiments of the present disclosure. In some embodiments, the process 1000 may be implemented as a set of instructions (e.g., an application) stored in the storage ROM 230 or RAM 240. The processor 220 and/or modules in FIG. 14 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting.

In 1010, target information may be obtained. The target information may include provider information of a service provider, first information associated with a first service request that has been accepted by the service provider, second information associated with a second service request to be allocated, and real-time information. The provider information and the real-time information may be collectively referred to as the reference information.

In some embodiments, a service associated with the service request may be a ride-sharing service associated with a vehicle (e.g., a carpooling service). An application scenario of the present disclosure may be a scenario in which a service provider who provides the ride-sharing service has accepted a service request and is waiting to be allocated another service request. For example, for a carpooling service, the service provider may be a driver that picks up passengers. The first service request may be a service request that has been accepted by the service provider. The second service request may be a service request to be allocated.

In some embodiments, the provider information of the service provider may include various kinds of information that can represent personal characteristics of the service provider. Take a carpooling service as an example, the service provider may be a driver that provides the carpooling service. The provider information may include but not limited to identity (ID) information of the driver, gender information of the driver, age information of the driver, service score information of the driver, star information of the driver, vehicle type information of the driver, current location information of the driver, etc.

In some embodiments, the first information associated with the first service request may include various kinds of information included in the first service request. For example, the first information associated with the first service request may include but not limited to a first start location, a first destination, a first start time, first user information associated with a first user of the first service request, etc. The second information associated with the second service request may include various kinds of information included in the second service request. For example, the second information may include but not limited to, a second start location, a second destination, a second start time, second user information associated with a second user of the second service request, etc. As used herein, the user information may include but not limited to ID information of the user, portrait information (e.g., gender information, age information, hobby information, occupation information) of the user, etc. The start time (e.g., the first start time, the second start time) used herein refers to a time point when a user (e.g., the first user, the second user) wishes to start off.

In some embodiments, the real-time information may include but not limited to current weather information, current time information (e.g., time point information, week information, Gregorian date information, lunar date information, holiday information), current traffic information, etc.

In 1020, feature information may be obtained based on the target information. In some embodiments, initial feature information may be first obtained based on the target information. The initial feature information may include initial feature information of an identity category and initial feature information of a non-identity category. Then, the initial feature information of the identity category and the initial feature information of the non-identity category may be modified to obtain the feature information.

In some embodiments, the initial feature information may include first initial feature information and second initial feature information. The first initial feature information may be obtained directly based on the target information. The second initial feature information may be estimated based on the target information. Specifically, the first initial feature information may be extracted directly from the target information. The second initial feature information may be estimated based on the target information according to, for example, a preset algorithm, a preset strategy, or a preset model.

In some embodiments, the first initial feature information may include one or more of: gender information of the service provider, age information of the service provider, service score information of the service provider, star information of the service provider, vehicle type information of the service provider, current location information of the service provider, weather information, or time information.

In some embodiments, the second initial feature information may include one or more of: a first distance of a first original route associated with the first service request, a second distance of a second original route associated with the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance of the first original route associated with the first service request, a second ratio of the second detour distance to the second distance of the second original route associated with the second service request, a pick-up time of the second service request, a pick-up distance of the second service request, and a third ratio of the pick-up distance to the fourth distance of the second modified route associated with the second service request. More detailed description of the original route, the modified route, the detour distance, and/or the detour time may be found elsewhere in the present disclosure (e.g., FIG. 4 and the description thererof).

In some embodiments, the initial feature information may include the initial feature information of the identity category (e.g., feature information associated with ID category) and the initial feature information of the non-identity category (e.g., feature information associated with non-ID category). The initial feature information of the identity category and the initial feature information of the non-identity category may be modified to obtain the feature information. The feature information may include first feature information, second feature information, and third feature information.

In some embodiments, the initial feature information of the identity category and the initial feature information of the non-identity category may be modified respectively based on the following operations. The initial feature information of the non-identity category may be entered a trained integration model as the input. The trained integration model may map the initial feature information of the non-identity category to a leaf node of each decision tree (each leaf node corresponding to a weighing value). The leaf nodes may be designated as target nodes and weighing values corresponding to the target nodes may be designated as feature values. Then feature representations associated with the initial feature information of the non-identity category in the integration model may be designated as output result associated with the trained integration model. Further, the first feature information may be obtained by normalizing the output results associated with the trained integration model. The second feature information may be obtained by normalizing the initial feature information of the non-identity category. The third feature information may be obtained by discretizing and normalizing the initial feature information of the identity category. As used herein, the trained integration model may be any reasonable integration model including but not limited to an Extreme Gradient Boosting (XGB) Model. The description of the trained integration model is not intended to be limiting.

In 1030, the feature information may be entered a trained linear regression model and a trained deep learning model as the input respectively.

In some embodiments, the trained linear regression model may be any reasonable linear regression model. The trained deep learning model may be any reasonable deep learning model (e.g., a Deep Neural Network (DNN) model). The descriptions of the trained linear regression model and the trained deep learning model are not intended to be limiting.

In 1040, a matching parameter associated with the first service request and the second service request may be determined by weighing a first output result (also referred to as "a first matching parameter") associated with the trained linear regression model and a second output result (also referred to as "a second matching parameter") associated with the trained deep learning model.

In some embodiments, the feature information may be entered the trained linear regression model and the trained deep learning model as the input respectively. The matching parameter may be determined by weighing the first output result associated with the trained linear regression model and the second output result associated with the trained deep learning model. The matching parameter may indicate a matching degree between the second service request and the service provider. The on-demand service system 100 may determine that the second service request matches with the service provider based on a result of the determination that the matching parameter is larger than or equal to a preset threshold.

In some embodiments, the first output result associated with the trained linear regression model and the second output result associated with the trained deep learning model may be weighted based on a first weighting coefficient corresponding to the first output result and a second weighting coefficient corresponding to the second output result, wherein the first weighting coefficient and the second weighting coefficient may be the same or different. The first weighting coefficient and the second weighting coefficient may be default settings of the on-demand service system 100 or may be adjustable under different situations.

In 1050, the second service request may be allocated to the service provider based on a result of the determination that the matching parameter is larger than or equal to the preset threshold.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 11:
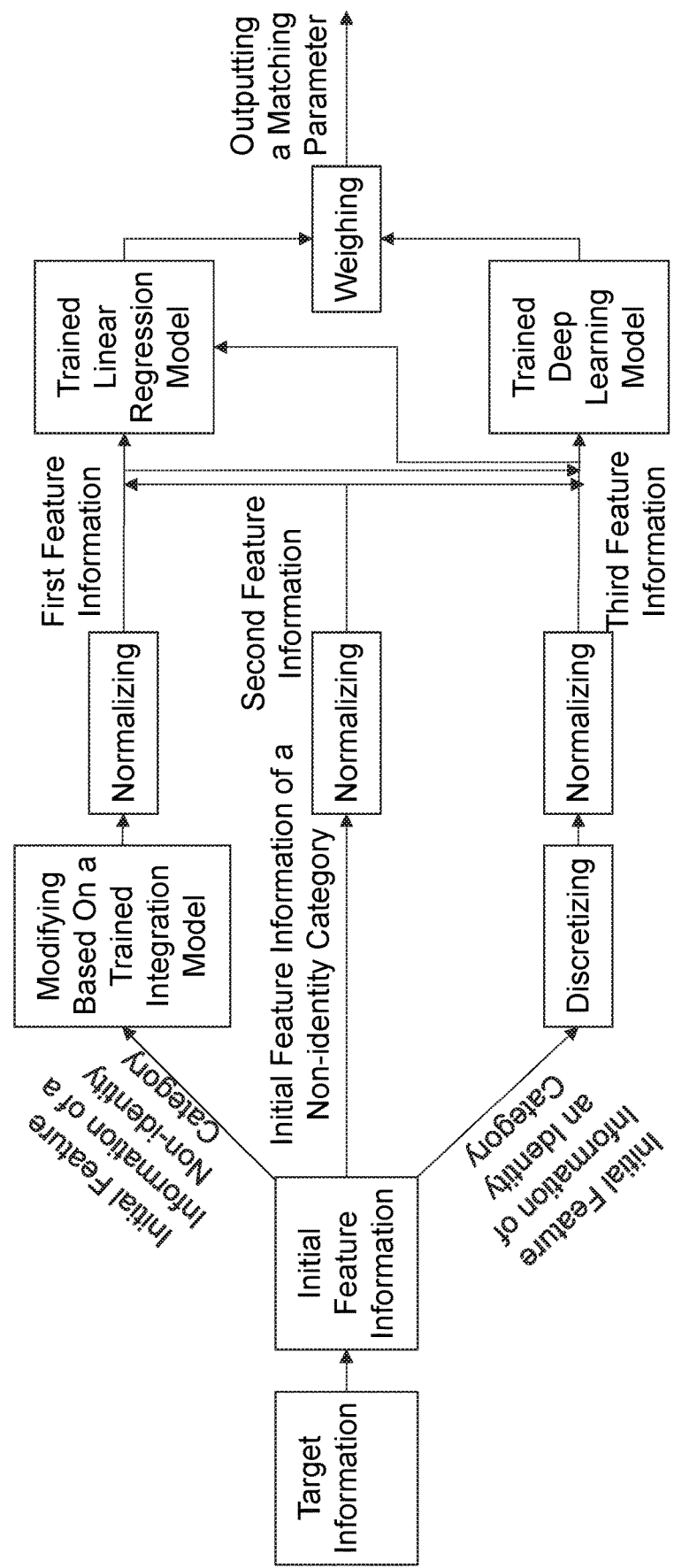
FIG. 11 is a schematic diagram of an exemplary scenario for allocating service requests according to some embodiments of the present disclosure.

FIG. 11 is a schematic diagram of an exemplary scenario for allocating service requests according to some embodiments of the present disclosure.

As shown in FIG. 11, the initial feature information may be determined based on the target information. The initial feature information may be classified as the initial feature information of the identity category and the initial feature information of the non-identity category. The first feature information may be determined by inputting the initial feature information of the non-identity category into the integration model and normalizing the output result associated with the integration model. The second feature information may be determined by normalizing the initial feature information of the non-identity category. The third feature information may be determined by discretizing and normalizing the initial feature information of the identity category. The first feature information, the second feature information, and the third feature information may be considered as the feature information and may be entered the trained linear regression model and the trained deep learning model as the input respectively. The matching parameter may be determined by weighing the first output result associated with the trained linear regression model and the second output result associated with the trained deep learning model. The second service request may be allocated based on the matching parameter.

A process for allocating service requests is provided in the above embodiments of the present disclosure. The target information may be obtained. The feature information may be determined based on the target information. The feature information may be entered the trained linear regression model and the trained deep learning model as the input respectively. The matching parameter may be determined by weighing the first output result associated with the linear regression model and the second output result associated with the deep learning model. The second service request may be allocated to the service provider based on a result of the determination that the matching parameter is larger than or equal to the preset threshold. As used herein, the target information may include the provider information of the service provider, the first information associated with the first service request that has been accepted by the service provider, the second information associated with the second service request to be allocated, and the real-time information. Since the matching degree between the second service request and the service provider is determined based on a combination of the linear regression model and the deep learning model, the matching between the second service request and the service provider may be more reasonable, and the utilization of service resources may be improved.

Figure 12:
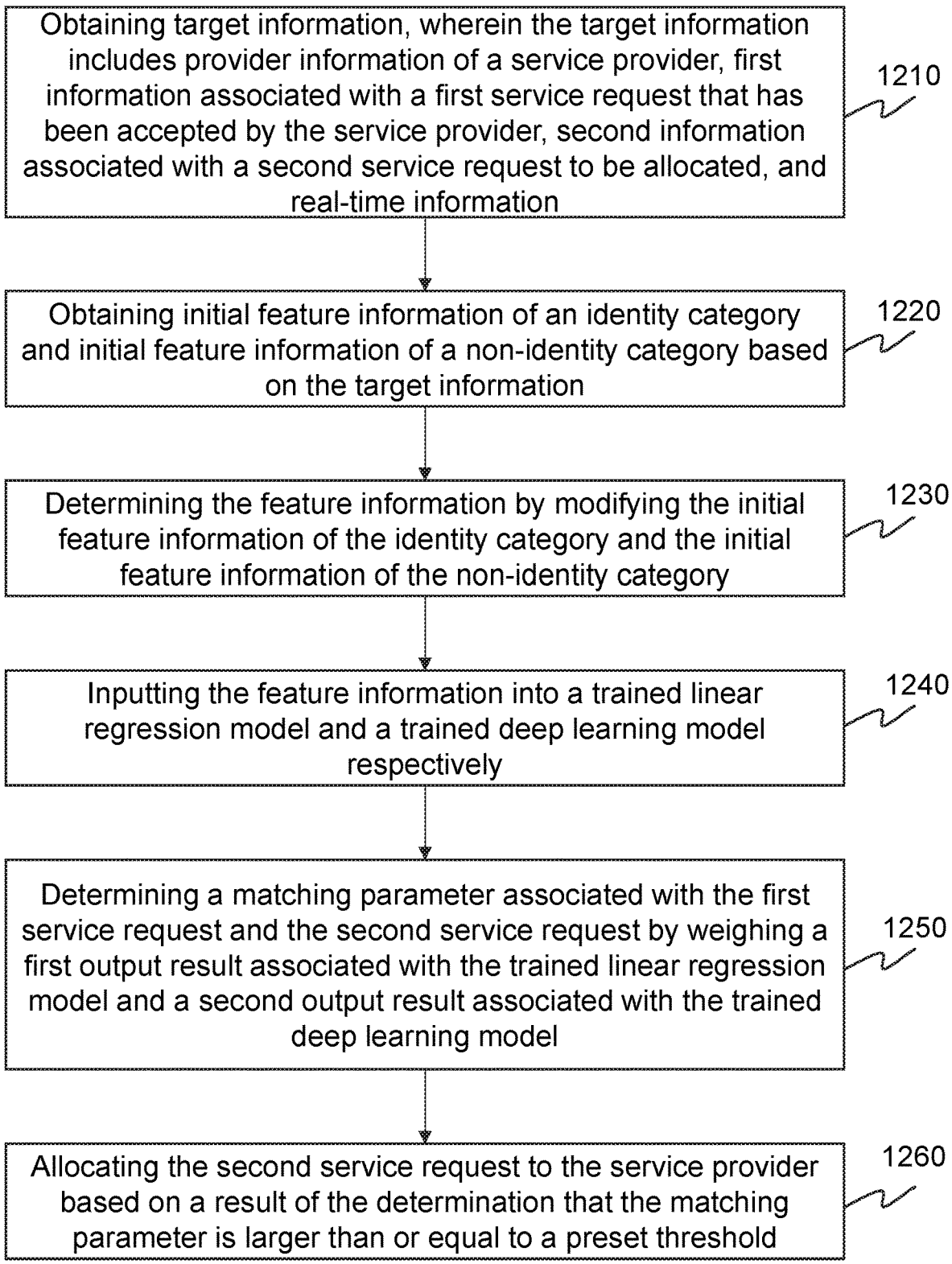
FIG. 12 is a flowchart illustrating an exemplary process for allocating service requests according to some embodiments of the present disclosure.

FIG. 12 is a flowchart illustrating an exemplary process for allocating service requests according to some embodiments of the present disclosure. In some embodiments, the process 1200 may be implemented as a set of instructions (e.g., an application) stored in the storage ROM 230 or RAM 240. The processor 220 and/or modules in FIG. 14 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, target information may be obtained. The target information may include provider information of a service provider, first information associated with a first service request that has been accepted by the service provider, second information associated with a second service request to be allocated, and the real-time information.

In 1220, initial feature information of an identity category and initial feature information of a non-identity category may be obtained based on the target information.

In 1230, the feature information may be determined by modifying the initial feature information of the identity category and the initial feature information of the non-identity category.

In 1240, the feature information may be entered a trained linear regression model and a trained deep learning model as the input respectively.

In 1250, a matching parameter associated with the first service request and the second service request may be determined by weighing a first output result associated with the trained linear regression model and a second output result associated with the trained deep learning model.

In 1260, the second service request may be allocated to the service provider based on a result of the determination that the matching parameter is larger than or equal to a preset threshold.

It should be noted that for operations which are similar to some operations of the process 1000, the descriptions may not be repeated in FIG. 12. More detailed descriptions of the similar operations may be found in some embodiments illustrated in FIG. 10.

A process for allocating service requests is provided in the above embodiments of the present disclosure. The target information may be obtained. The initial feature information of the identity category and the initial feature information of the non-identity category may be obtained based on the target information. The feature information may be obtained by modifying the initial feature information of the identity category and the initial feature information of the non-identity category. The feature information may be entered the trained linear regression model and the trained deep learning model as the input respectively. The matching parameter may be determined by weighing the first output result associated with the trained linear regression model and the second output result associated with the trained deep learning model. The second service request may be allocated to the service provider based on a result of the determination that the matching parameter is larger than or equal to the preset threshold. As used herein, the target information may include the provider information of the service provider, the first information associated with the first service request that has been accepted by the service provider, the second information associated with the second service request to be allocated, and the real-time information. Since the feature information is obtained by modifying the initial feature information of the identity category and the initial feature information of the non-identity category respectively, and further the matching degree between the second service request and the service provider is determined based on a combination of the trained linear regression model and the trained deep learning model, the matching between the second service request and the service provider may be more reasonable, and the utilization of service resources may be improved.

Figure 13:
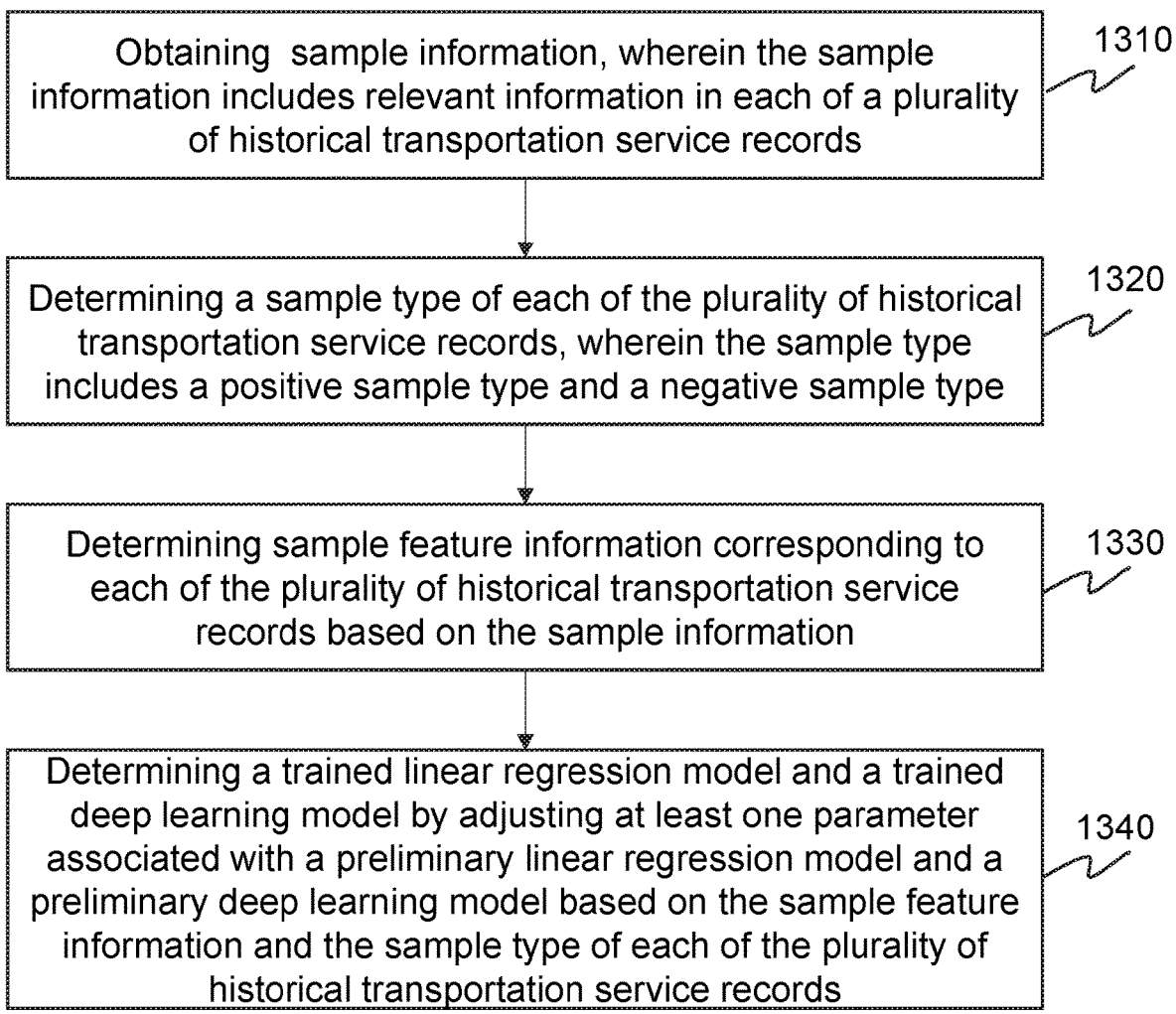
FIG. 13 is a flowchart illustrating an exemplary training process for determining at least one trained model for allocating service requests according to some embodiments of the present disclosure.

FIG. 13 is a flowchart illustrating an exemplary training process for determining a trained model for allocating service requests according to some embodiments of the present disclosure. In some embodiments, the process 1300 may be implemented as a set of instructions (e.g., an application) stored in the storage ROM 230 or RAM 240. The processor 220 and/or modules in FIG. 15 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting.

In 1310, sample information may be obtained. The sample information may include relevant information in each of a plurality of historical transportation service records.

In some embodiments, for any of the plurality of historical transportation service records, the relevant information may include historical real-time information, historical provider information of a historical service provider, first historical information associated with a first historical order that was accepted by the service provider, and second historical information associated with a second historical order that was matched with the first historical order and allocated to the historical service provider. The historical provider information of the historical service provider and the historical real-time information may be collectively referred to as the historical reference information.

In some embodiments, the historical provider information of the historical service provider may include various kinds of information that may represent personal characteristics of the historical service provider. Take a historical carpooling service as an example, the historical service provider may be a historical driver that provided the historical carpooling service. The historical provider information of the historical service provider may include but not limited to ID information of the historical driver, gender information of the historical driver, age information of the historical driver, historical service score information of the historical driver, historical star information of the historical driver, historical vehicle type information of the historical driver, historical location information of the historical driver, etc.

In some embodiments, the first historical information associated with the first historical order may include various kinds of historical information included in the first historical order. For example, the first historical information may include but not limited to a first historical start location, a first historical destination, a first historical start time, and first historical user information associated with a first historical user of the first historical order. The second historical information associated with the second historical order may include various kinds of historical information included in the second historical order. For example, the second historical information may include but not limited to a second historical start location, a second historical destination, a second start time, and second historical user information associated with a second historical user of the second historical order. As used herein, the historical user information may include but not limited to ID information of the historical user, portrait information (e.g., gender information, age information, hobby information, occupation information) of the historical user, etc.

In some embodiments, the historical real-time information may include the information that was "real time" at the time of the historical order, including, for example, historical weather information, historical time information (e.g., historical time point information, historical week information, historical Gregorian date information, historical lunar date information, historical holiday information), historical traffic information, etc.

In 1320, a sample type of each of the plurality of historical transportation service records may be determined based on the sample information. The sample type may include a positive sample type and a negative sample type.

In some embodiments, the sample type of each of the plurality of historical transportation service records may be determined based on historical evaluation information and historical response information in the sample information. For example, if historical evaluation information of a historical transportation service record is relatively good or a second historical order included in a historical transportation service record was accepted by a historical service provider of the historical transportation service record, the sample type corresponding to the historical transportation service record may be determined as a positive sample type. If historical evaluation information of a historical transportation service record is relatively bad or a second historical order included in a historical transportation service record was not accepted by a historical service provider of the historical transportation service record, the sample type corresponding to the historical transportation service record may be determined as a negative sample type. More descriptions of the determination of the sample type may be found elsewhere in the present disclosure (e.g., FIG. 7 and the description thereof).

In 1330, sample feature information corresponding to each of the plurality of historical transportation service records may be determined based on the sample information.

In some embodiments, initial sample feature information of each of the plurality of historical transportation service records may be first obtained based on the sample information. The initial sample feature information may include initial sample feature information of an identity category and initial sample feature information of a non-identity category. Then, the sample feature information may be determined by modifying the initial sample feature information of the identity category and the initial sample feature information of the non-identity category.

In some embodiments, for any of the plurality of historical transportation service records, the initial sample feature information may include first initial sample feature information and second initial sample feature information. The first initial sample feature information may be obtained directly based on the sample information. The second initial sample feature information may be estimated based on the sample information. Specifically, the first initial sample feature information may be extracted directly from the sample information. The second initial sample feature information may be estimated based on the sample information according to, for example, a predetermined algorithm, a preset strategy, or a preset model.

In some embodiments, the first initial sample feature information corresponding to a historical transportation service record may include one or more of: gender information of a historical service provider of the historical transportation service record, age information of the historical service provider, historical service score information of the historical service provider, historical star information of the historical service provider, historical vehicle type information of the historical service provider, historical location information of the historical service provider, historical weather information, or historical time information.

In some embodiments, the second initial sample feature information corresponding to a historical transportation service record may include one or more of: a first historical distance of a first historical original route associated with the first historical order, a second historical distance of a second historical original route associated with the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance of the first historical original route associated with the first historical order, a second historical ratio of the second historical detour distance to the second historical distance of the second historical original route associated with the second historical order, an historical pick-up time of the second historical order, an historical pick-up distance of the second historical order, and a third historical ratio of the historical pick-up distance to the fourth historical distance of the second historical modified route associated with the second historical order.

In some embodiments, the initial sample feature information may include the initial sample feature information of the identity category (e.g., feature information associated with ID category) and the initial sample feature information of the non-identity category (e.g., feature information associated with non-ID category). The sample feature information may be determined by modifying the initial sample feature information of the identity category and the initial sample feature information of the non-identity category. The sample feature information may include first sample feature information, second sample feature information, and third sample feature information.

In some embodiments, the initial sample feature information of the identity category and the initial sample feature information of the non-identity category may be modified respectively based on following operations. The first sample feature information may be determined by inputting the initial sample feature information of the non-identity category into a trained integration model and normalizing an output result associated with the trained integration model. The second sample feature information may be determined by normalizing the initial sample feature information of the non-identity category. The third sample feature information may be determined by discretizing and normalizing the initial sample feature information of identity category. As used herein, the trained integration model may be any reasonable trained integration model including but not limited to an Extreme Gradient Boosting (XGB) Model. More descriptions of the determination of the sample feature information may be found elsewhere in the present disclosure (e.g., FIG. 7 and the description thereof).

In 1340, a trained linear regression model and a trained deep learning model may be determined by adjusting at least one parameter associated with a preliminary linear regression model and a preliminary deep learning model based on the sample feature information and the sample type of each of the plurality of historical transportation service records.

In some embodiments, the sample feature information of each of the plurality of historical transportation service records may be entered into the preliminary linear regression model and the preliminary deep learning model as the input respectively. A reference matching parameter (also referred to as "sample matching parameter") may be determined by weighing a first sample output result (also referred to as "first sample matching parameter") associated with the preliminary linear regression model and a second sample output result (also referred to as "second sample matching parameter) associated with the preliminary deep learning model. The at least one parameter associated with the preliminary linear regression model and the preliminary deep learning model may be adjusted based on the reference matching parameter and the sample type of each of the plurality of historical transportation service records.

Specifically, the trained linear regression model and the trained deep learning model may be determined based on the following process. Firstly, sample feature information associated with a dataset may be obtained. The dataset may include a training dataset and a validation dataset (the training dataset may correspond to a plurality of first historical transportation service records, and the validation dataset may correspond to a plurality of second historical transportation service records). Secondly, at least one parameter associated with a current linear regression (e.g., a preliminary linear regression model) and a current deep learning model (e.g., a preliminary deep learning model) may be adjusted based on the sample feature information associated with the training dataset. The current linear regression model and the current deep learning model may be validated based on sample feature information associated with the validation dataset. Thirdly, the current linear regression model and the current deep learning model may be designated as the trained linear regression model and the trained deep learning model until a validation result satisfies a condition.

The at least one parameter associated with the current linear regression model and the current deep learning model may be adjusted based on the sample feature information associated with the training dataset according to the following process. The sample feature information associated with the training dataset may be entered the current linear regression model and the current deep learning model as the input respectively. For each of the plurality of historical transportation service records, a reference matching parameter may be determined by weighing a first probability (i.e., a probability that a sample type of a historical transportation service record is a positive sample type) associated with the current linear regression model and a second probability (i.e., a probability that a sample type of a historical transportation service record is a positive sample type) associated with the current deep learning model. Further, a Receiver Operating Characteristic (ROC) curve may be obtained based on the reference matching parameters and sample types corresponding to the plurality of transportation service records. An Area Under Curve (AUC) value may be obtained based on the ROC curve. The at least one parameter associated with the current linear regression model and the current deep learning model may be adjusted based on a result of a determination that the AUC value is smaller than or equal to a preset AUC threshold. Further, the process of adjusting the at least one parameter associated with the current linear regression model and the current deep learning model may be repeated. The operation of validating the current linear regression model and the current deep learning model may be performed based on a result of the determination that the AUC value is larger than the preset AUC threshold.

The current linear regression model and the current deep learning model may be validated based on the sample feature information associated with the validation dataset according to the following process. A first AUC value may be obtained by inputting the sample feature information associated with the training dataset into the current linear regression model and the current deep learning model. A second AUC value may be obtained by inputting the sample feature information associated with the validation dataset into the current linear regression model and the current deep learning model. A difference may be obtained by subtracting the second AUC value from the first AUC value. The process of adjusting the at least one parameter associated with the current linear regression model and the current deep learning model may be repeated based on a result of the determination that an absolute value of the difference is larger than a second preset threshold. The on-demand service system 100 may determine that the validation result satisfies the condition based on a result of the determination that the absolute value of the difference is smaller than the second preset threshold.

In some embodiments, the trained linear regression model may be any reasonable linear regression model. The trained deep learning model (e.g., Deep Neural Networks (DNN) model) may be any reasonable deep learning model. The description of the trained linear regression model and the trained deep learning model is not intended to be limiting.

A training process for determining a trained model (e.g., a trained linear regression model, a trained deep learning model) for allocating service requests is provided in the above embodiments of the present disclosure. The sample information may be obtained. The sample type of each of the plurality of historical transportation service records may be determined based on the sample information. The sample information may include the relevant information in each of a plurality of historical transportation service records. The sample feature information corresponding to each of the plurality of historical transportation service records may be determined based on the sample information. The trained linear regression model and the trained deep learning model may be determined by adjusting the at least one parameter associated with the preliminary linear regression model and the preliminary deep learning model based on the sample feature information and the sample type of each of the plurality of historical transportation service records. According to the training process, a trained model for allocating service requests associated with ride-sharing services may be obtained. The matching between the second service request and the service provider may be more reasonable, and the utilization of service resources may be improved.

In some alternative embodiments, the above process may further include determining the trained integration model based on the sample type of each of the plurality of historical transportation service records and the initial sample feature information of the non-identity category of each of the plurality of historical transportation service records.

In some embodiments, the trained integration model may be determined based on the sample type of each of the plurality of historical transportation service records and the initial sample feature information of the non-identity category of each of the plurality of historical transportation service records according to the following process. Firstly, initial sample feature information of a non-identity category associated with a dataset may be obtained. The dataset may include a training dataset and a validation dataset (the training dataset may correspond to a plurality of first historical transportation service records, and the validation dataset may correspond to a plurality of second historical transportation service records). Secondly, a parameter associated with a current integration model (e.g., a preliminary integration model) may be adjusted based on the sample feature information of the non-identity category associated with the training dataset. The current integration model may be validated based on sample feature information of the non-identity category associated with the validation dataset. Thirdly, the current integration model may be designated as the trained integration model until a validation result satisfies a condition.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 14:
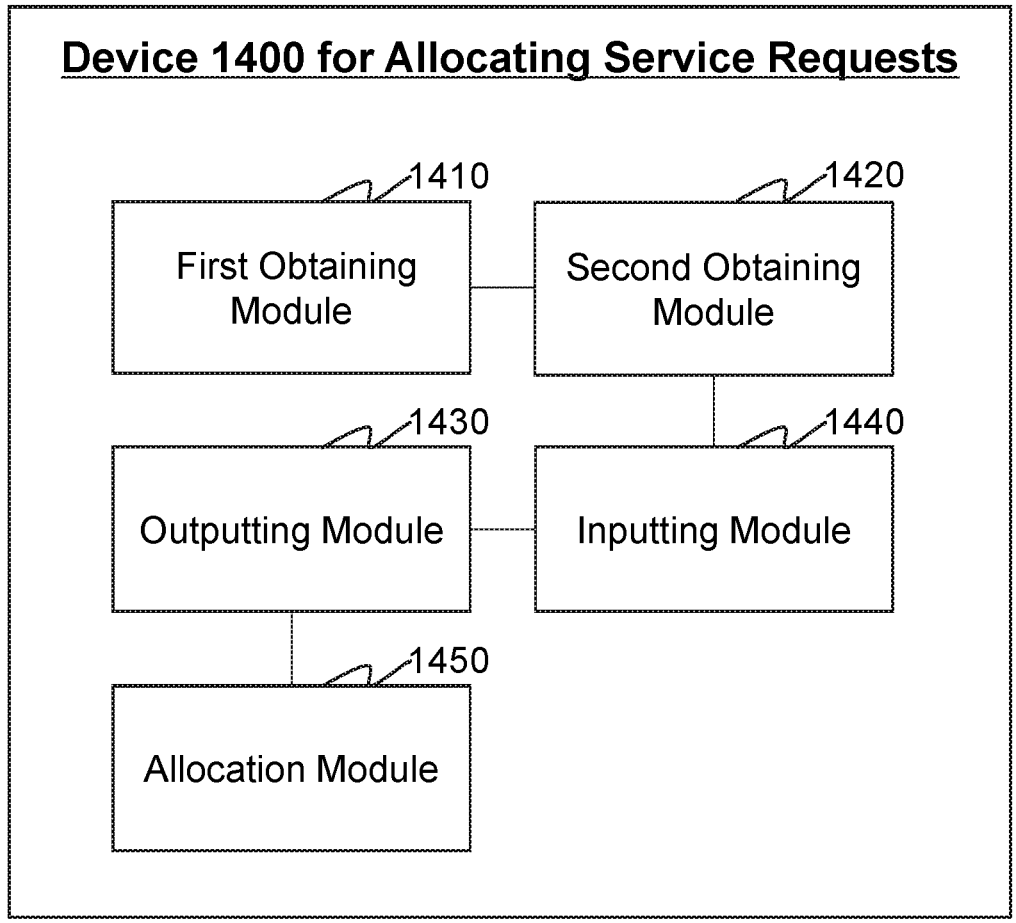
FIG. 14 is a block diagram illustrating an exemplary device for allocating service requests according to some embodiments of the present disclosure.

FIG. 14 is a block diagram illustrating an exemplary device for allocating service requests according to some embodiments of the present disclosure. The device 1400 may include a first obtaining module 1410, a second obtaining module 1420, an inputting module 1430, an outputting module 1440, and an allocation module 1450. In some embodiments, the device 1400 may be integrated into the server 110. For example, the device 1400 may be part of the processing engine 112.

The first obtaining module 1410 may be configured to obtain target information. The target information may include provider information of a service provider, first information associated with a first service request that has been accepted by the service provider, second information associated with a second service request to be allocated, and the real-time information. The provider information and the real-time information may be collectively referred to as the reference information.

In some embodiments, a service associated with the service request may be a ride-sharing service associated with a vehicle (e.g., a carpooling service). An application scenario of the present disclosure may be a scenario in which a service provider who provides the ride-sharing service has accepted a service request and is waiting to be allocated another service request. For example, for a carpooling service, the service provider may be a driver that picks up passengers. The first service request may be a service request that has been accepted by the service provider. The second service request may be a service request to be allocated.

In some embodiments, the provider information of the service provider may include various kinds of information that can represent personal characteristics of the service provider. Take a carpooling service as an example, the service provider may be a driver that provides the carpooling service. The provider information may include but not limited to identity (ID) information of the driver, gender information of the driver, age information of the driver, service score information of the driver, star information of the driver, vehicle type information of the driver, current location information of the driver, etc.

In some embodiments, the first information associated with the first service request may include various kinds of information included in the first service request. For example, the first information associated with the first service request may include but not limited to a first start location, a first destination, a first start time, first user information associated with a first user of the first service request, etc. The second information associated with the second service request may include various kinds of information included in the second service request. For example, the second information may include but not limited to, a second start location, a second destination, a second start time, second user information associated with a second user of the second service request, etc. As used herein, the user information may include but not limited to ID information of the user, portrait information (e.g., gender information, age information, hobby information, occupation information) of the user, etc. The start time (e.g., the first start time, the second start time) used herein refers to a time point when a user (e.g., the first user, the second user) wishes to start off.

In some embodiments, the real-time information may include but not limited to current weather information, current time information (e.g., time point information, week information, Gregorian date information, lunar date information, holiday information), current traffic information, etc.

The second obtaining module 1420 may be configured to obtain feature information based on the target information.

In some embodiments, initial feature information may be first obtained based on the target information. The initial feature information may include initial feature information of an identity category and initial feature information of a non-identity category. Then, the initial feature information of the identity category and the initial feature information of the non-identity category may be modified to obtain the feature information.

In some embodiments, the initial feature information may include first initial feature information and second initial feature information. The first initial feature information may be obtained directly based on the target information. The second initial feature information may be estimated based on the target information. Specifically, the first initial feature information may be extracted directly from the target information. The second initial feature information may be estimated based on the target information according to, for example, a preset algorithm, a preset strategy, or a preset model.

In some embodiments, the first initial feature information may include one or more of: gender information of the service provider, age information of the service provider, service score information of the service provider, star information of the service provider, vehicle type information of the service provider, current location information of the service provider, weather information, or time information.

In some embodiments, the second initial feature information may include one or more of: a first distance of a first original route associated with the first service request, a second distance of a second original route associated with the second service request, a third distance of a first modified route associated with the first service request, a fourth distance of a second modified route associated with the second service request, a combined distance of a combined route associated with the first service request and the second service request, a combined time of the combined route associated with the first service request and the second service request, a first detour distance associated with the first service request, a second detour distance associated with the second service request, a first detour time associated with the first service request, a second detour time associated with the second service request, a first ratio of the first detour distance to the first distance of the first original route associated with the first service request, a second ratio of the second detour distance to the second distance of the second original route associated with the second service request, a pick-up time of the second service request, a pick-up distance of the second service request, and a third ratio of the pick-up distance to the fourth distance of the second modified route associated with the second service request.

In some embodiments, the initial feature information may include the initial feature information of the identity category (e.g., feature information associated with ID category) and the initial feature information of the non-identity category (e.g., feature information associated with non-ID category). The initial feature information of the identity category and the initial feature information of the non-identity category may be modified to obtain the feature information. The feature information may include first feature information, second feature information, and third feature information.

In some embodiments, the initial feature information of the identity category and the initial feature information of the non-identity category may be modified respectively based on the following operations. The initial feature information of the non-identity category may be entered a trained integration model as the input. The trained integration model may map the initial feature information of the non-identity category to a leaf node of each decision tree (each leaf node corresponding to a weighing value). The leaf nodes may be designated as target nodes and weighing values corresponding to the target nodes may be designated as feature values. Then feature representations associated with the initial feature information of the non-identity category in the integration model may be designated as output result associated with the trained integration model. Further, the first feature information may be obtained by normalizing the output results associated with the trained integration model. The second feature information may be obtained by normalizing the initial feature information of the non-identity category. The third feature information may be obtained by discretizing and normalizing the initial feature information of the identity category. As used herein, the trained integration model may be any reasonable integration model including but not limited to an Extreme Gradient Boosting (XGB) Model. The description of the trained integration model is not intended to be limiting.

The inputting module 1430 may be configured to input the feature information into a trained linear regression model and a trained deep learning model respectively.

In some embodiments, the trained linear regression model may be any reasonable linear regression model. The trained deep learning model may be any reasonable deep learning model (e.g., a Deep Neural Network (DNN) model). The descriptions of the trained linear regression model and the trained deep learning model are not intended to be limiting.

The outputting module 1440 may be configured to determine a matching parameter associated with the first service request and the second service request by weighing a first output result associated with the trained linear regression model and a second output result associated with the trained deep learning model.

In some embodiments, the feature information may be entered the trained linear regression model and the trained deep learning model as the input respectively. The matching parameter may be determined by weighing the first output result associated with the trained linear regression model and the second output result associated with the trained deep learning model. The matching parameter may indicate a matching degree between the second service request and the service provider. The on-demand service system 100 may determine the second service request matches with the service provider based on a result of the determination that the matching parameter is larger than or equal to a preset threshold.

The allocation module 1450 may be configured to allocate the second service request to the service provider based on a result of the determination that the matching parameter is larger than or equal to a preset threshold.

A device for allocating service requests is provided in the above embodiments of the present disclosure. The target information may be obtained. The feature information may be determined based on the target information. The feature information may be entered the trained linear regression model and the trained deep learning model as the input respectively. The matching parameter may be determined by weighing the first output result associated with the linear regression model and the second output result associated with the deep learning model. The second service request may be allocated to the service provider based on a result of the determination that the matching parameter is larger than or equal to the preset threshold. As used herein, the target information may include the provider information of the service provider, the first information associated with the first service request that has been accepted by the service provider, the second information associated with the second service request to be allocated, and the real-time information. Since the matching degree between the second service request and the service provider is determined based on a combination of the linear regression model and the deep learning model, the matching between the second service request and the service provider may be more reasonable, and the utilization of service resources may be improved.

In some alternative embodiments, the second obtaining module 1420 may include an obtaining unit and a processing unit (not shown in FIG. 14).

The obtaining unit may be configured to obtain initial feature information of an identity category and initial feature information of a non-identity category based on the target information.

The processing unit may be configured to determine feature information by modifying the initial feature information of the identity category and the initial feature information of the non-identity category.

A device for allocating service requests is provided in the above embodiments of the present disclosure. The target information may be obtained. The initial feature information of the identity category and the initial feature information of the non-identity category may be obtained based on the target information. The feature information may be obtained by modifying the initial feature information of the identity category and the initial feature information of the non-identity category. The feature information may be entered the trained linear regression model and the trained deep learning model as the input respectively. The matching parameter associated with the first service request and the second service request may be determined by weighing the first output result associated with the trained linear regression model and the second output result associated with the trained deep learning model. The second service request may be allocated to the service provider based on a result of the determination that the matching parameter is larger than or equal to a preset threshold. As used herein, the target information may include the provider information of the service provider, the first information associated with the first service request that has been accepted by the service provider, the second information associated with the second service request to be allocated, and the real-time information. Since the feature information is obtained by modifying the initial feature information of the identity category and the initial feature information of the non-identity category respectively, and the further matching degree between the second service request and the service provider is determined based on a combination of the trained linear regression model and the trained deep learning model, the matching between the second service request and the service provider may be more reasonable, and the utilization of service resources may be improved.

In some alternative embodiments, the feature information may include first feature information, second feature information, and third feature information.

The processing unit may be configured to determine the first feature information by inputting the initial feature information of the non-identity category into a trained integration model and normalizing an output result associated with the trained integration model. The processing unit may determine the second feature information by normalizing the initial feature information of the non-identity category. The processing unit may determine the third feature information by discretizing and normalizing the initial feature information of the identity category.

In some alternative embodiments, the first information associated with the first service request may include a first start location, a first destination, and a first start time. The second information associated with the second service request includes a second start location, a second destination, and a second start time.

The modules in the device 1400 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 15:
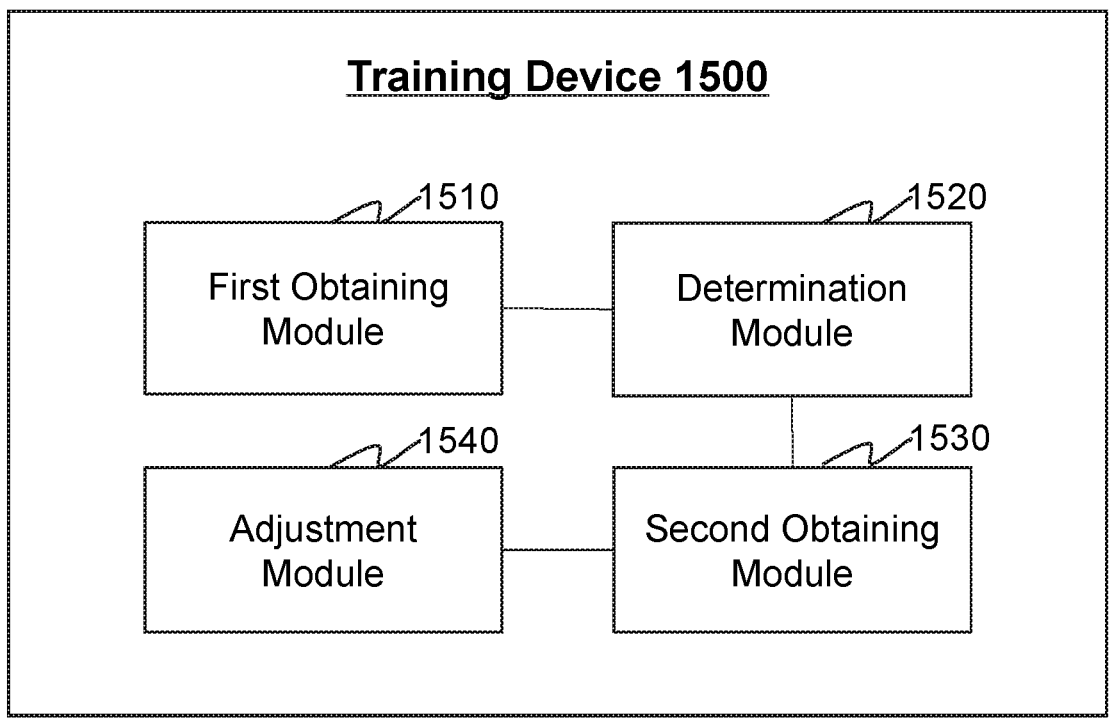
FIG. 15 is a block diagram illustrating an exemplary training device for determining at least one trained model for allocating service requests according to some embodiments of the present disclosure.

FIG. 15 is a block diagram illustrating an exemplary training device for determining a trained model for allocating service requests according to some embodiments of the present disclosure. The training device 1500 may include a first obtaining module 1510, a determination module 1520, a second obtaining module 1530, and an adjustment module 1540. In some embodiments, the training device 1500 may be integrated into the server 110. For example, the training device 1500 may be integrated into a component (e.g., a training module 1640) of the processing engine 112.

The first obtaining module 1510 may be configured to obtain sample information. The sample information may include relevant information in each of a plurality of historical transportation service records.

In some embodiments, for any of the plurality of historical transportation service records, the relevant information may include historical real-time information, historical provider information of a historical service provider, first historical information associated with a first historical order that was accepted by the service provider, and second historical information associated with a second historical order that was matched with the first historical order and allocated to the historical service provider. The historical provider information of the historical service provider and the historical real-time information may be collectively referred to as the historical reference information.

In some embodiments, the historical provider information of the historical service provider may include various kinds of information that may represent personal characteristics of the historical service provider. Take a historical carpooling service as an example, the historical service provider may be a historical driver that provided the historical carpooling service. The historical provider information of the historical service provider may include but not limited to ID information of the historical driver, gender information of the historical driver, age information of the historical driver, historical service score information of the historical driver, historical star information of the historical driver, historical vehicle type information of the historical driver, historical location information of the historical driver, etc.

In some embodiments, the first historical information associated with the first historical order may include various kinds of historical information included in the first historical order. For example, the first historical information may include but not limited to a first historical start location, a first historical destination, a first historical start time, and first historical user information associated with a first historical user of the first historical order. The second historical information associated with the second historical order may include various kinds of historical information included in the second historical order. For example, the second historical information may include but not limited to a second historical start location, a second historical destination, a second historical start time, and second historical user information associated with a second historical user of the second historical order. As used herein, the historical user information may include but not limited to ID information of the historical user, portrait information (e.g., gender information, age information, hobby information, occupation information) of the historical user, etc.

In some embodiments, the historical real-time information may include the information that was "real time" at the time of the historical order, including, for example, historical weather information, historical time information (e.g., historical time point information, historical week information, historical Gregorian date information, historical lunar date information, historical holiday information), historical traffic information, etc.

The determination module 1520 may be configured to determine a sample type of each of the plurality of historical transportation service records.

In some embodiments, the sample type of each of the plurality of historical transportation service records may be determined based on historical evaluation information and historical response information in the sample information. For example, if historical evaluation information of a historical transportation service record is relatively good or a second historical order included in a historical transportation service record was accepted by a historical service provider of the historical transportation service record, the sample type corresponding to the historical transportation service record may be determined as a positive sample type. If historical evaluation information of a historical transportation service record is relatively bad or a second historical order included in a historical transportation service record was not accepted by a historical service provider of the historical transportation service record, the sample type corresponding to the historical transportation service record may be determined as a negative sample type.

The second obtaining module 1530 may be configured to determine sample feature information corresponding to each of the plurality of historical transportation service records based on the sample information.

In some embodiments, initial sample feature information of each of the plurality of historical transportation service records may be first obtained based on the sample information. The initial sample feature information may include initial sample feature information of an identity category and initial sample feature information of a non-identity category. Then, the sample feature information may be determined by modifying the initial sample feature information of the identity category and the initial sample feature information of the non-identity category.

In some embodiments, for any of the plurality of historical transportation service records, the initial sample feature information may include first initial sample feature information and second initial sample feature information. The first initial sample feature information may be obtained directly based on the sample information. The second initial sample feature information may be estimated based on the sample information. Specifically, the first initial sample feature information may be extracted directly from the sample information. The second initial sample feature information may be estimated based on the sample information according to, for example, a predetermined algorithm, a preset strategy, or a preset model.

In some embodiments, the first initial sample feature information corresponding to a historical transportation service record may include one or more of: gender information of a historical service provider of the historical transportation service record, age information of the historical service provider, historical service score information of the historical service provider, historical star information of the historical service provider, historical vehicle type information of the historical service provider, historical location information of the historical service provider, historical weather information, or historical time information.

In some embodiments, the second initial sample feature information corresponding to a historical transportation service record may include one or more of: a first historical distance of a first historical original route associated with the first historical order, a second historical distance of a second historical original route associated with the second historical order, a third historical distance of a first historical modified route associated with the first historical order, a fourth historical distance of a second historical modified route associated with the second historical order, a historical combined distance of a historical combined route associated with the first historical order and the second historical order, a historical combined time of the historical combined route associated with the first historical order and the second historical order, a first historical detour distance associated with the first historical order, a second historical detour distance associated with the second historical order, a first historical detour time associated with the first historical order, a second historical detour time associated with the second historical order, a first historical ratio of the first historical detour distance to the first historical distance of the first historical original route associated with the first historical order, a second historical ratio of the second historical detour distance to the second historical distance of the second historical original route associated with the second historical order, an historical pick-up time of the second historical order, an historical pick-up distance of the second historical order, and a third historical ratio of the historical pick-up distance to the fourth historical distance of the second historical modified route associated with the second historical order.

In some embodiments, the initial sample feature information may include the initial sample feature information of the identity category (e.g., feature information associated with ID category) and the initial sample feature information of the non-identity category (e.g., feature information associated with non-ID category). The sample feature information may be determined by modifying the initial sample feature information of the identity category and the initial sample feature information of the non-identity category. The sample feature information may include first sample feature information, second sample feature information, and third sample feature information.

In some embodiments, the initial sample feature information of the identity category and the initial sample feature information of the non-identity category may be modified respectively based on following operations. The first sample feature information may be determined by inputting the initial sample feature information of the non-identity category into a trained integration model and normalizing an output result associated with the trained integration model. The second sample feature information may be determined by normalizing the initial sample feature information of the non-identity category. The third sample feature information may be determined by discretizing and normalizing the initial sample feature information of identity category. As used herein, the trained integration model may be any reasonable trained integration model including but not limited to an Extreme Gradient Boosting (XGB) Model.

The adjustment module 1540 may be configured to determine the trained linear regression model and the trained deep learning model by adjusting at least one parameter associated with a preliminary linear regression model and a preliminary deep learning model based on the sample feature information and the sample type of each of the plurality of historical transportation service records. For any of the plurality of historical transportation service records, the relevant information may include historical real-time information, historical provider information of a historical service provider, first historical information associated with a first historical order that was accepted by the service provider, and second historical information associated with a second historical order that was matched with the first historical order and allocated to the historical service provider.

In some embodiments, for any of the plurality of historical transportation service records, the relevant information may include historical real-time information, historical provider information of a historical service provider, first historical information associated with a first historical order that was accepted by the historical service provider, and second historical information associated with a second historical order that was matched with the first historical order and allocated to the historical service provider. The historical provider information of the historical service provider and the historical real-time information may be collectively referred to as historical reference information.

In some embodiments, the sample feature information of each of the plurality of historical transportation service records may be entered the preliminary linear regression model and the preliminary deep learning model as the input respectively. A reference matching parameter (also referred to as "sample matching parameter") may be determined by weighing a first sample output result (also referred to as "first sample matching parameter") associated with the preliminary linear regression model and a second sample output result (also referred to as "second sample matching parameter) associated with the preliminary deep learning model. The at least one parameter associated with the preliminary linear regression model and the preliminary deep learning model may be adjusted based on the reference matching parameter and the sample type of each of the plurality of historical transportation service records.

Specifically, the trained linear regression model and the trained deep learning model may be determined based on the following process. Firstly, sample feature information associated with a dataset may be obtained. The dataset may include a training dataset and a validation dataset (the training dataset may correspond to a plurality of first historical transportation service records, and the validation dataset may correspond to a plurality of second historical transportation service records). Secondly, at least one parameter associated with a current linear regression (e.g., a preliminary linear regression model) and a current deep learning model (e.g., a preliminary deep learning model) may be adjusted based on the sample feature information associated with the training dataset. The current linear regression model and the current deep learning model may be validated based on sample feature information associated with the validation dataset. Thirdly, the current linear regression model and the current deep learning model may be designated as the trained linear regression model and the trained deep learning model until a validation result satisfies a condition.

The at least one parameter associated with the current linear regression model and the current deep learning model may be adjusted based on the sample feature information associated with the training dataset according to the following process. The sample feature information associated with the training dataset may be entered the current linear regression model and the current deep learning model as the input respectively. For each of the plurality of historical transportation service records, a reference matching parameter may be determined by weighing a first probability (i.e., a probability that a sample type of a historical transportation service record is a positive sample type) associated with the current linear regression model and a second probability (i.e., a probability that a sample type of a historical transportation service record is a positive sample type) associated with the current deep learning model. Further, a Receiver Operating Characteristic (ROC) curve may be obtained based on the reference matching parameters and sample types corresponding to the plurality of transportation service records. An Area Under Curve (AUC) value may be obtained based on the ROC curve. The at least one parameter associated with the current linear regression model and the current deep learning model may be adjusted based on a result of a determination that the AUC value is smaller than or equal to a preset AUC threshold. Further, the process of adjusting the at least one parameter associated with the current linear regression model and the current deep learning model may be repeated. The operation of validating the current linear regression model and the current deep learning model may be performed based on a result of the determination that the AUC value is larger than the preset AUC threshold.

The current linear regression model and the current deep learning model may be validated based on the sample feature information associated with the validation dataset according to the following process. A first AUC value may be obtained by inputting the sample feature information associated with the training dataset into the current linear regression model and the current deep learning model. A second AUC value may be obtained by inputting the sample feature information associated with the validation dataset into the current linear regression model and the current deep learning model. A difference may be obtained by subtracting the second AUC value from the first AUC value. The process of adjusting the at least one parameter associated with the current linear regression model and the current deep learning model may be repeated based on a result of the determination that an absolute value of the difference is larger than a second preset threshold. The on-demand service system 100 may determine that the validation result satisfies the condition based on a result of the determination that the absolute value of the difference is smaller than the second preset threshold.

In some embodiments, the trained linear regression model may be any reasonable linear regression model. The trained deep learning model (e.g., Deep Neural Networks (DNN) model) may be any reasonable deep learning model. The description of the trained linear regression model and the trained deep learning model is not intended to be limiting.

A training device for determining a trained model for allocating service requests is provided in the above embodiments of the present disclosure. The sample information may be obtained. The sample type of each of the plurality of historical transportation service records may be determined based on the sample information. The sample information may include the relevant information in each of a plurality of historical transportation service records. The sample feature information corresponding to each of the plurality of historical transportation service records may be determined based on the sample information. The trained linear regression model and the trained deep learning model may be determined by adjusting the at least one parameter associated with the preliminary linear regression model and the preliminary deep learning model based on the sample feature information and the sample type of each of the plurality of historical transportation service records. According to the training device, a trained model for allocating service requests associated with carpooling services may be obtained. The matching between the second service request and the service provider may be more reasonable, and the utilization of service resources may be improved.

In some alternative embodiments, the adjustment module 1540 may be configured to input the sample feature information of each of the plurality of historical transportation service records into the preliminary linear regression model and the preliminary deep learning model respectively. The adjustment module 1540 may determine a reference matching parameter by weighing a first sample output result associated with the preliminary linear regression model and a second sample output result associated with the preliminary deep learning model. The adjustment module 1540 may further adjust at least one parameter associated with the preliminary linear regression model and the preliminary deep learning model based on the reference matching parameters and the sample type of each of the plurality of historical transportation service records.

In some alternative embodiments, for any of the plurality of historical transportation service records, the second obtaining module 1530 may obtain sample feature information based on the sample information according to the following process. The second obtaining module 1530 may obtain initial sample feature information of an identity category and initial sample feature information of a non-identity category based on the relevant information corresponding to the historical transportation record in the sample information. The second obtaining module 1530 may determine the sample feature information by modifying the initial sample feature information of the identity category and the initial sample feature information of the non-identity category respectively.

In some alternative embodiments, the sample information may include first sample feature information, second sample feature information, and third sample feature information.

The second obtaining module 1530 may determine the sample feature information by modifying the initial sample feature information of the identity category and the initial sample feature information of the non-identity category respectively according to the following process. The second obtaining module 1530 may determine the first sample feature information by inputting the initial sample feature information of the non-identity category into a trained integration model and normalizing a sample output result associated with the trained integration model. The second obtaining module 1530 may determine the second sample feature information by normalizing the initial sample feature information of the non-identity category. The second obtaining module 1530 may determine the third sample feature information by discretizing and normalizing the initial sample feature information of the identity category.

In some alternative embodiments, the training device 1500 may further include a training module (not shown in FIG. 15). The training module may be configured to determine the trained integration model based on the sample type of each of the plurality of historical transportation service records and the initial sample feature information of the non-identity category of each of the plurality of historical transportation service records.

In some embodiments, the trained integration model may be determined based on the sample type of each of the plurality of historical transportation service records and the initial sample feature information of the non-identity category of each of the plurality of historical transportation service records according to the following process. Firstly, initial sample feature information of a non-identity category associated with a dataset may be obtained. The dataset may include a training dataset and a validation dataset (the training dataset may correspond to a plurality of first historical transportation service records, and the validation dataset may correspond to a plurality of second historical transportation service records). Secondly, a parameter associated with a current integration model (e.g., a preliminary integration model) may be adjusted based on the sample feature information of the non-identity category associated with the training dataset. The current integration model may be validated based on sample feature information of the non-identity category associated with the validation dataset. Thirdly, the current integration model may be designated as the trained integration model until a validation result satisfies a condition.

In some alternative embodiments, the first historical information associated with the first historical order may include a first historical start location, a first historical destination, and a first historical start time, and the second historical information associated with the second historical order may include a second historical start location, a second historical destination, and a second historical start time.

It should be noted that some modules described in FIG. 15 may be configured to perform other functions described in the present disclosure. For example, the first obtaining module 1510 may also be configured to perform functions of the first obtaining module 1410, that is, the first obtaining module 1510 may also be configured to obtain the target information.

The modules in the training device 1500 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

The present disclosure may also provide a first computer storage medium including first instructions. When executing by at least one processor, the first instructions may direct the at least one processor to perform a process (e.g., process 1000, process 1200) described elsewhere in the present disclosure. The present disclosure may also provide a second computer storage medium including second instructions. When executing by at least one processor, the second instructions may direct the at least one processor to perform a process (e.g., process 1300) described elsewhere in the present disclosure.

Figure 16:
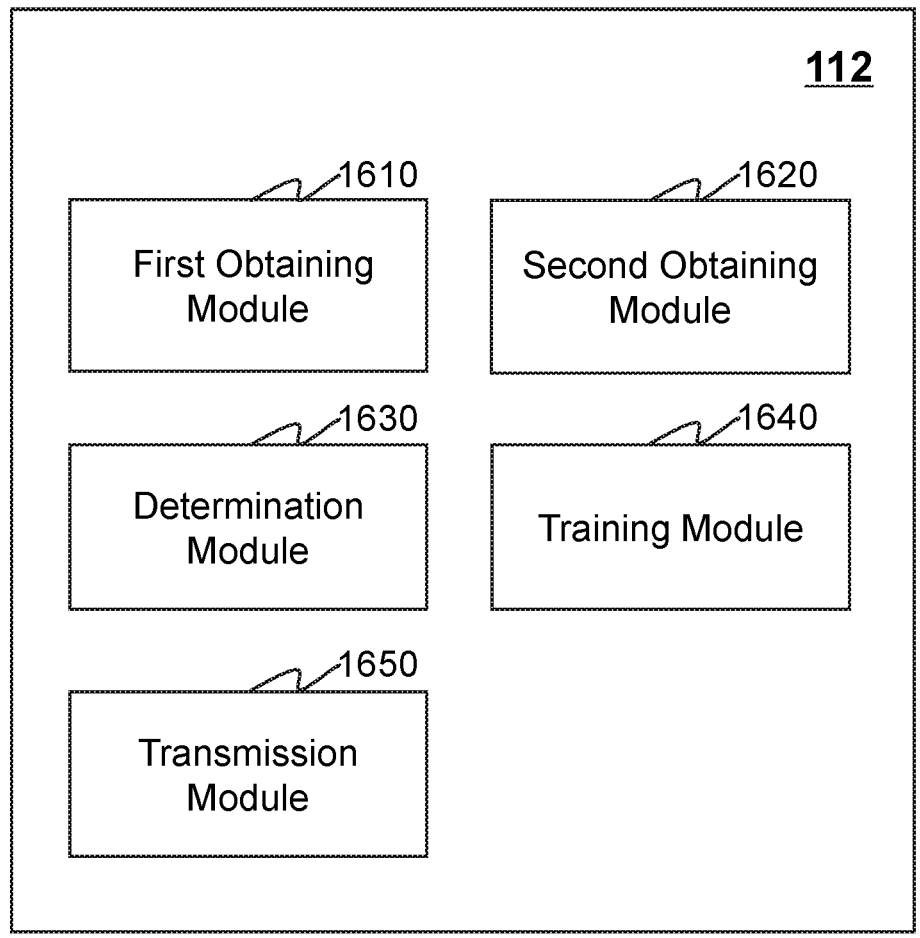
FIG. 16 is a block diagram illustrating an exemplary processing engine according to some embodiments of the present disclosure.

FIG. 16 is a block diagram illustrating an exemplary processing engine according to some embodiments of the present disclosure. The processing engine 112 may include a first obtaining module 1610, a second obtaining module 1620, a determination module 1630, a training module 1640, and a transmission module 1650.

The first obtaining module 1610 may be configured to obtain first information associated with a first service request. The first service request may have been allocated to a service provider and have been accepted by the service provider. More descriptions of the first information may be found elsewhere in the present disclosure (e.g., FIG. 4, FIG. 8, FIG. 10, FIG. 14, and the descriptions thereof). In some embodiments, a first service requester of the first service request may initiate the first service request via an application (e.g., the application 380) installed on and executed by a first requester terminal (e.g., the requester terminal 130).

The second obtaining module 1620 may be configured to obtain second information associated with a second service request via a request receiving port (e.g., the COM port 250). The second service request may be a service request to be allocated. More descriptions of the second information may be found elsewhere in the present disclosure (e.g., FIG. 4, FIG. 8, FIG. 10, FIG. 14, and the descriptions thereof). In some embodiments, a second service requester of the second service request may initiate the second service request via an application (e.g., the application 380) installed on and executed by a second requester terminal (e.g., the requester terminal 130). The second requester terminal may be different from the first service requester terminal.

The determination module 1630 may be configured to determine a matching parameter based on the first information and the second information by using at least one trained matching model. The matching parameter may indicate a matching degree between the first service request and the second service request. The larger the matching parameter is, the higher the matching degree between the first service request and the second service request may be.

In some embodiments, the determination module 1630 may obtain the at least one trained matching model from the training device 900, the training device 1500, the training module 1640, or a storage device (e.g., the storage 150) disclosed elsewhere in the present disclosure. In some embodiments, the at least one trained matching model may include an extreme gradient boosting model, a linear regression model, a deep learning network model, or the like, or any combination thereof.

In some embodiments, the determination module 1630 may further obtain reference information associated with the service provider and determine the matching parameter based on the first information, the second information, and the reference information. In some embodiments, the reference information may include provider information associated with the service provider, weather information, time information, traffic information, or the like, or any combination thereof. More descriptions of the reference information may be found elsewhere in the present disclosure (e.g., FIG. 4, FIG. 8, FIG. 10, FIG. 14, and the descriptions thereof).

The training module 1640 may be configured to determine whether the matching parameter is larger than a threshold. The threshold may be default settings of the on-demand service system 100 or may be adjustable under different situations.

The transmission module 1650 may be configured to transmit data associated with the second service request to the provider terminal 140 associated with the service provider based on a result of the determination that the matching parameter is larger than the threshold via the network 120. In some embodiments, the data associated with the second service request may include the second information (e.g., the second start location, the second destination, the second start time) associated with the second service request, the matching parameter between the first service request and the second service request, an estimated route from a location of the service provider to the second start location, or the like, or any combination thereof. In response to receiving the data associated with the second service request, the provider terminal 140 may display at least portion of the received data associated with the second service request in a graphic user interface.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first obtaining module 1610 and the second obtaining module 1620 may be combined as a single module which may both obtain the first information associated with the first service request and obtain second information associated with a second service request via a request receiving port. As another example, the processing engine 112 may include a storage module (not shown) which may be used to store data generated by the above-mentioned modules. As a further example, the training module 1640 may be unnecessary and the at least one trained matching model may be obtained from a storage device (e.g., the storage 150) disclosed elsewhere in the present disclosure.

FIG. 17 is a flowchart illustrating an exemplary process for allocating service requests to a service provider according to some embodiments of the present disclosure. In some embodiments, the process 1700 may be implemented as a set of instructions (e.g., an application) stored in the storage ROM 230 or RAM 240. The processor 220 and/or the modules in FIG. 16 may execute the set of instructions, and when executing the instructions, the processor 220 and/or the modules may be configured to perform the process 1700. The operations of the illustrated process presented below are intended to be illustrative. In some embodiments, the process 1700 may be accomplished with one or more additional operations not described and/or without one or more of the operations herein discussed. Additionally, the order in which the operations of the process as illustrated in FIG. 17 and described below is not intended to be limiting.

In 1710, the processing engine 112 (e.g., the first obtaining module 1610) (e.g., the interface circuits of the processor 220) may obtain first information associated with a first service request. The first service request may have been allocated to a service provider and have been accepted by the service provider. More descriptions of the first information may be found elsewhere in the present disclosure (e.g., FIG. 4, FIG. 8, FIG. 10, FIG. 14, and the descriptions thereof). In some embodiments, a first service requester of the first service request may initiate the first service request via an application (e.g., the application 380) installed on and executed by a first requester terminal (e.g., the requester terminal 130).

In 1720, the processing engine 112 (e.g., the second obtaining module 1620) (e.g., the interface circuits of the processor 220) may obtain second information associated with a second service request via a request receiving port (e.g., the COM port 250). The second service request may be a service request to be allocated. More descriptions of the second information may be found elsewhere in the present disclosure (e.g., FIG. 4, FIG. 8, FIG. 10, FIG. 14, and the descriptions thereof). In some embodiments, a second service requester of the second service request may initiate the second service request via an application (e.g., the application 380) installed on and executed by a second requester terminal (e.g., the requester terminal 130). The second requester terminal may be different from the first service requester terminal.

In 1730, the processing engine 112 (e.g., the determination module 1630) (e.g., the processing circuits of the processor 220) may determine a matching parameter based on the first information and the second information by using at least one trained matching model. The matching parameter may indicate a matching degree between the first service request and the second service request. The larger the matching parameter is, the higher the matching degree between the first service request and the second service request may be.

In some embodiments, the processing engine 112 may obtain the at least one trained matching model from the training device 900, the training device 1500, the training module 1640, or a storage device (e.g., the storage 150) disclosed elsewhere in the present disclosure. In some embodiments, the at least one trained matching model may include an extreme gradient boosting model, a linear regression model, a deep learning network model, or the like, or any combination thereof.

In some embodiments, the processing engine 112 may further obtain reference information associated with the service provider and determine the matching parameter based on the first information, the second information, and the reference information. In some embodiments, the reference information may include provider information associated with the service provider, weather information, time information, traffic information, or the like, or any combination thereof. More descriptions of the reference information may be found elsewhere in the present disclosure (e.g., FIG. 4, FIG. 8, FIG. 10, FIG. 14, and the descriptions thereof).

In 1740, the processing engine 112 (e.g., the determination module 1630) (e.g., the processing circuits of the processor 220) may determine whether the matching parameter is larger than a threshold. The threshold may be default settings of the on-demand service system 100 or may be adjustable under different situations.

In 1750, the processing engine 112 (e.g., the transmission module 1650) (e.g., the interface circuits of the processor 220) may transmit data associated with the second service request to the provider terminal 140 associated with the service provider based on a result of the determination that the matching parameter is larger than the threshold via the network 120. In some embodiments, the data associated with the second service request may include the second information (e.g., the second start location, the second destination, the second start time) associated with the second service request, the matching parameter between the first service request and the second service request, an estimated route from a location of the service provider to the second start location, or the like, or any combination thereof. In response to receiving the data associated with the second service request, the provider terminal 140 may display at least portion of the received data associated with the second service request in a graphic user interface.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 18:
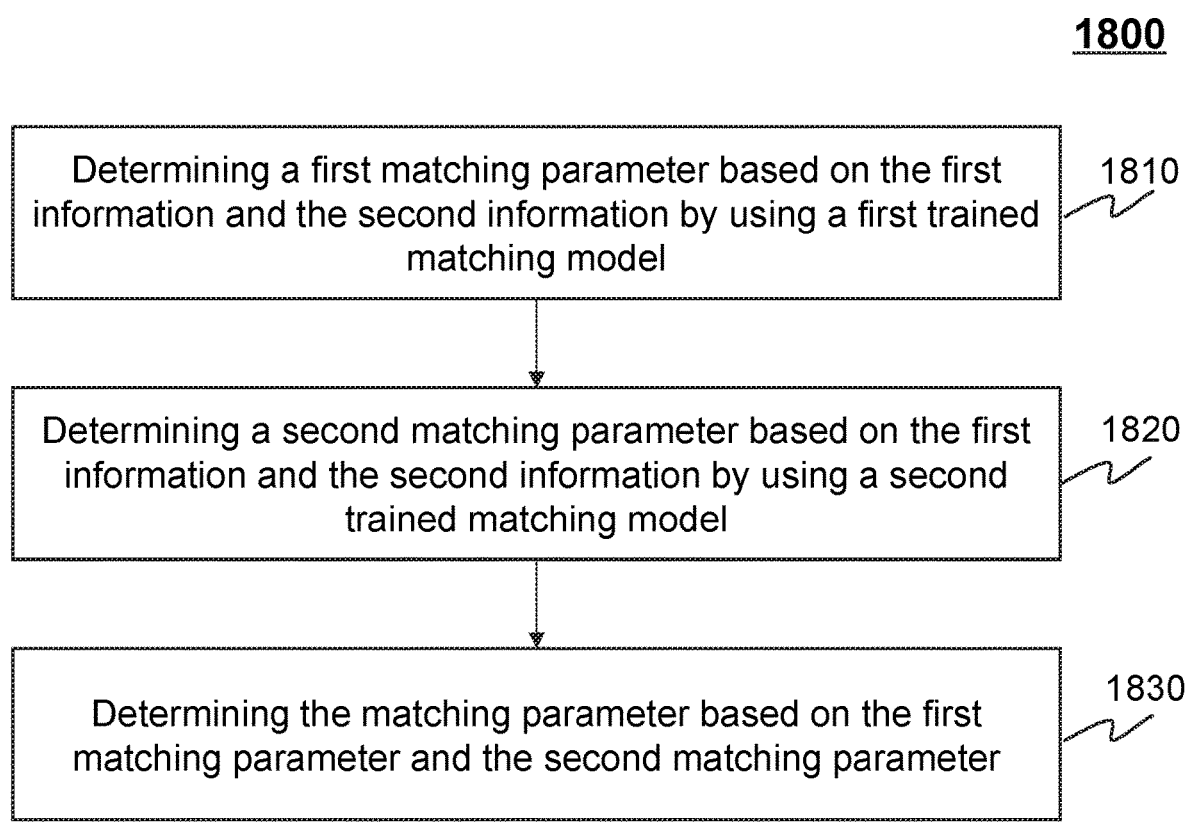
FIG. 18 is a flowchart illustrating an exemplary process for determining a matching parameter by using two trained models according to some embodiments of the present disclosure.

FIG. 18 is a flowchart illustrating an exemplary process for determining a matching parameter by using two trained models according to some embodiments of the present disclosure. In some embodiments, the process 1800 may be implemented as a set of instructions (e.g., an application) stored in the storage ROM 230 or RAM 240. The processor 220 and/or the modules in FIG. 16 may execute the set of instructions, and when executing the instructions, the processor 220 and/or the modules may be configured to perform the process 1800. The operations of the illustrated process presented below are intended to be illustrative. In some embodiments, the process 1800 may be accomplished with one or more additional operations not described and/or without one or more of the operations herein discussed. Additionally, the order in which the operations of the process as illustrated in FIG. 18 and described below is not intended to be limiting. In some embodiments, operation 1730 of process 1700 may be performed based on process 1800.

In 1810, the processing engine 112 (e.g., the determination module 1630) (e.g., the processing circuits of the processor 220) may determine a first matching parameter based on the first information and the second information by using a first trained matching model (e.g., the trained linear regression model described in connection with FIGS. 10-15). The first matching parameter refers to a first output result associated the first trained matching model based on the first information and the second information.

In 1820, the processing engine 112 (e.g., the determination module 1630) (e.g., the processing circuits of the processor 220) may determine a second matching parameter based on the first information and the second information by using a second trained matching model (e.g., a trained linear deep learning model described in connection with FIGS. 10-15). The second matching parameter refers to a second output result associated the second trained matching model based on the first information and the second information.

In 1830, the processing engine 112 (e.g., the determination module 1630) (e.g., the processing circuits of the processor 220) may determine the matching parameter based on the first matching parameter and the second matching parameter. In some embodiments, the processing engine 112 may determine the matching parameter by weighing the first matching parameter and the second matching parameter. In some embodiments, the processing engine 112 may weigh the first matching parameter and the second matching parameter based on a first weighting coefficient corresponding to the first matching parameter and a second weighting coefficient corresponding to the second matching parameter. The first weighting coefficient and the second weighting coefficient may be the same or different. The first weighting coefficient and the second weighting coefficient may be default settings of the on-demand service system 100 or may be adjustable under different situations.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 19 is a flowchart illustrating an exemplary process for determining at least one trained matching model based on feature information of a plurality of training samples according to some embodiments of the present disclosure. In some embodiments, the process 1900 may be implemented as a set of instructions (e.g., an application) stored in the storage ROM 230 or RAM 240. The processor 220 and/or the training module 1640 may execute the set of instructions, and when executing the instructions, the processor 220 and/or the training module 1640 may be configured to perform the process 1900. The operations of the illustrated process presented below are intended to be illustrative. In some embodiments, the process 1900 may be accomplished with one or more additional operations not described and/or without one or more of the operations herein discussed. Additionally, the order in which the operations of the process as illustrated in FIG. 19 and described below is not intended to be limiting.

In 1910, the processing engine 112 (e.g., the training module 1640) (e.g., the interface circuits of the processor 220) may obtain a plurality training samples including at least one positive training sample and at least one negative training sample. The processing engine 112 may obtain the plurality training samples based on a plurality of historical transportation service records. Each of the plurality of historical transportation service records may include first historical information associated with a first historical order that was accepted by a historical service provider, second historical information associated with a second historical order that was matched with the first historical order, historical reference information associated with the historical service provider, or the like, or any combination thereof. As described elsewhere in the present disclosure, the positive training sample corresponds to a historical transportation service record with a positive sample type, and the negative training sample corresponds to a historical transportation service record with a negative sample type. More detailed descriptions of the plurality of historical transportation service records may be found elsewhere in the present disclosure (e.g., FIG. 6, FIG. 7, FIG. 9, FIG. 13, FIG. 15, and the descriptions thereof).

In 1920, the processing engine 112 (e.g., the training module 1640) (e.g., the processing circuits of the processor 220) may extract feature information (also referred to herein as "sample feature information") of each of the training samples.

In some embodiments, as described in connection with operation 730 and/or operation 1330, the feature information may include first initial feature information obtained from the plurality of training samples and second initial feature information estimated based on the plurality of training samples.

In some embodiments, as described in connection with operation 1330, the processing engine 112 may obtain the feature information (e.g., first feature information, second feature information, third feature information) by modifying initial feature information of an identity category and initial feature information of a non-identity category. For example, the processing engine 112 may determine a first feature result based on a trained integration model (e.g., the trained integration model described in connection with FIG. 13) and the initial feature information of the non-identity category. The processing engine 112 may also determine the first feature information of the each of the plurality of training samples by normalizing the first feature result. As another example, the processing engine 112 may determine the second feature information of the each of the plurality of training samples by normalizing the initial feature information of the non-identity category. As a further example, the processing engine 112 may determine the third feature information of the each of the plurality of training samples by discretizing and normalizing the initial feature information of the identity category. More detailed descriptions of the feature information may be found elsewhere in the present disclosure (e.g., FIG. 13 and the description thereof).

In 1930, the processing engine 112 (e.g., the training module 1640) (e.g., the processing circuits of the processor 220) may obtain at least one preliminary matching model. The at least one preliminary matching model may include a preliminary gradient boosting model, a preliminary linear regression model, a preliminary deep learning network model, etc. The preliminary matching model may include at least one preliminary parameter (e.g., a weight matrix, a bias vector) which may be default setting of the on-demand service system 100 or may be defined by an operator.

In 1940, the processing engine 112 (e.g., the training module 1640) (e.g., the processing circuits of the processor 220) may determine a plurality of sample matching parameters corresponding to the plurality of training samples based on the at least one preliminary matching model and the feature information of the plurality of training samples. Take a specific training sample as an example, the sample matching parameter may indicate a matching degree between a second historical order and a first historical order included in the training sample.

In 1950, the processing engine 112 (e.g., the training module 1640) (e.g., the processing circuits of the processor 220) may determine whether the sample matching parameters satisfy a first preset condition. For example, the processing engine 112 may obtain a ROC curve and an AUC value based on the sample matching parameters. Further, the processing engine 112 may determine whether the AUC value is smaller than or equal to a preset AUC threshold. More descriptions of the ROC curve and the AUC value may be found elsewhere in the present disclosure (e.g., FIG. 7, FIG. 13, and the descriptions thereof). As another example, the processing engine 112 may determine a loss function of the at least one preliminary matching model and determine a value of the loss function based on the sample matching parameters. Further, the processing engine 112 may determine whether the value of the loss function is less than a loss threshold. The loss threshold may be default settings of the on-demand service system 100 or may be adjustable under different situations.

In response to the determination that the sample matching parameters satisfy the first preset condition, the processing engine 112 (e.g., the training module 1640) (e.g., the processing circuits of the processor 220) may designate the at least one preliminary matching model as the at least one trained matching model in 2040. On the other hand, in response to the determination that the sample matching parameters do not satisfy the first preset condition, the processing engine 112 may execute the process 1900 to return 1930 to update the at least one preliminary matching model. For example, the processing engine 112 may update the at least one preliminary parameter associated with the at least one preliminary matching model to produce at least one updated matching model.

The processing engine 112 may also determine whether a plurality of updated sample matching parameters determined based on the at least one updated matching model satisfy the first preset condition. In response to the determination that the updated sample matching parameters satisfy the first preset condition, the processing engine 112 may designate the at least one updated matching model as the at least one trained matching model in 1960. On the other hand, in response to the determination that the updated sample matching parameters still do not satisfy the first preset condition, the processing engine 112 may still update the at least one updated matching model (i.e., the process 1900 proceeds to 1930) until the plurality of updated sample matching parameters satisfy the first preset condition.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing engine 112 may update the trained matching model at a certain time interval (e.g., per month, per two months) based on a plurality of newly obtained historical transportation trip records.

Figure 20:
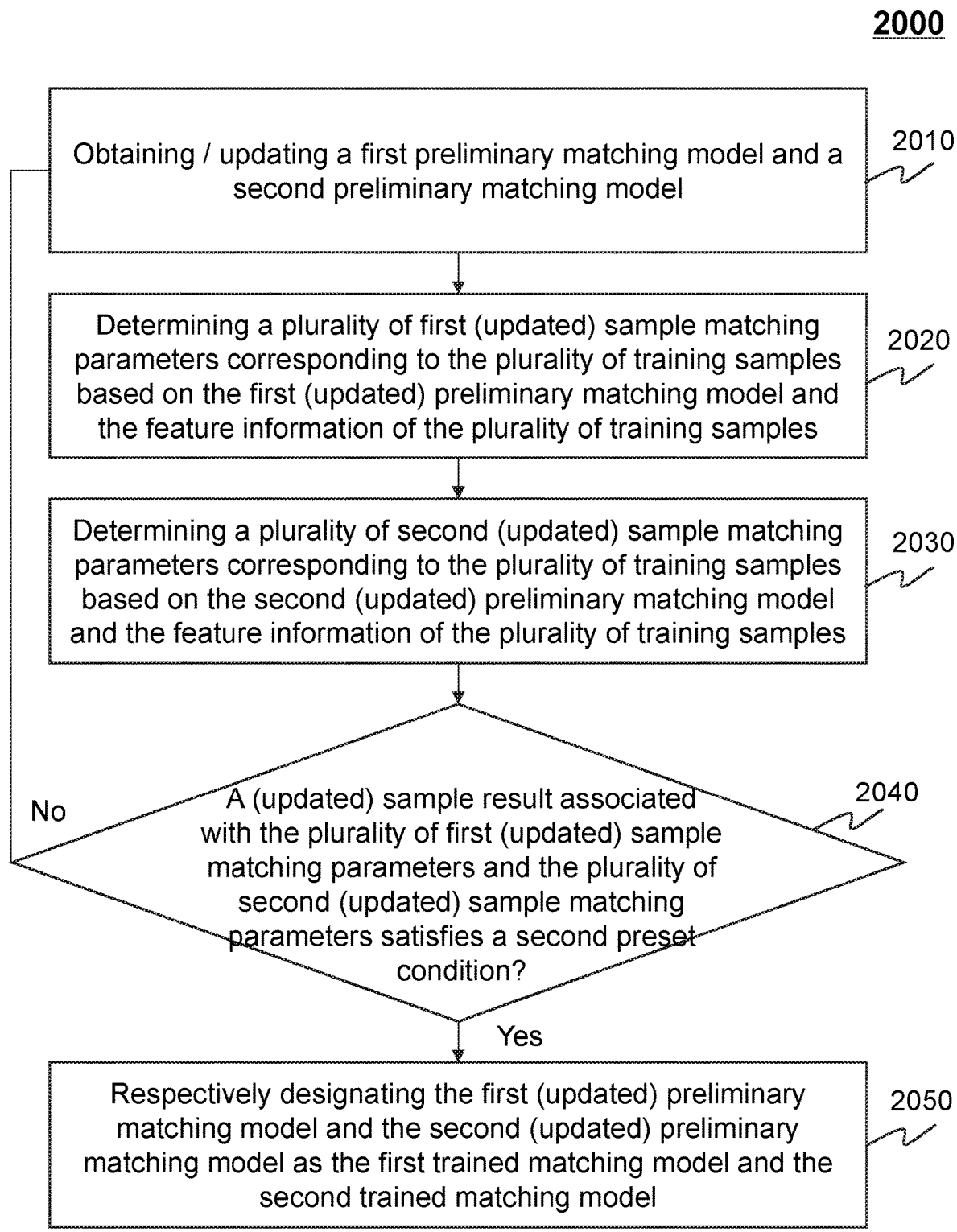
FIG. 20 is a flowchart illustrating an exemplary process for determining two trained matching models for allocating service requests according to some embodiments of the present disclosure.

FIG. 20 is a flowchart illustrating an exemplary process for determining two trained models according to some embodiments of the present disclosure. In some embodiments, the process 2000 may be implemented as a set of instructions (e.g., an application) stored in the storage ROM 230 or RAM 240. The processor 220 and/or the training module 1640 may execute the set of instructions, and when executing the instructions, the processor 220 and/or the training module 1640 may be configured to perform the process 2000. The operations of the illustrated process presented below are intended to be illustrative. In some embodiments, the process 2000 may be accomplished with one or more additional operations not described and/or without one or more of the operations herein discussed. Additionally, the order in which the operations of the process as illustrated in FIG. 20 and described below is not intended to be limiting.

In 2010, as described in connection with 1920, the processing engine 112 (e.g., the training module 1640) (e.g., the processing circuits of the processor 220) may obtain a first preliminary matching model (e.g., a preliminary linear regression model) and a second preliminary matching model (e.g., a preliminary deep learning model).

In 2020, the processing engine 112 (e.g., the training module 1640) (e.g., the processing circuits of the processor 220) may determine a plurality of first sample matching parameters corresponding to the plurality of training samples based on the first preliminary matching model and the feature information of the plurality of training samples.

In 2030, the processing engine 112 (e.g., the training module 1640) (e.g., the processing circuits of the processor 220) may determine a plurality of second sample matching parameters corresponding to the plurality of training samples based on the second preliminary matching model and the feature information of the plurality of training samples.

In 2040, the processing engine 112 (e.g., the training module 1640) (e.g., the processing circuits of the processor 220) may determine whether a sample result associated with the plurality of first sample matching parameters and the plurality of second sample matching parameters satisfies a second preset condition. In some embodiments, the processing engine 112 may determine the sample result by weighing the plurality of first sample matching parameters and the plurality of second sample matching parameters. The second preset condition may be same as or different from the first preset condition.

In response to the determination that the sample result satisfies the second preset condition, the processing engine 112 (e.g., the training module 1640) (e.g., the processing circuits of the processor 220) may respectively designate the first preliminary matching model and the second preliminary as the first trained matching model and the second trained matching model in 2050. On the other hand, in response to the determination that the sample result does not satisfy the second preset condition, the processing engine 112 may execute the process 2000 to return 2010 to update the first preliminary matching model and the second preliminary matching model. For example, the processing engine 112 may update at least one preliminary parameter associated with the first preliminary matching model and the second preliminary matching model to produce the first updated matching model and the second updated matching model.

Further, the processing engine 112 may determine whether an updated sample result based on the first updated matching model and the second updated matching model satisfies the second preset condition. In response to the determination that the updated sample result satisfies the second preset condition, the processing engine 112 may respectively designate the first updated matching model and the second updated matching model as the first trained matching model and the second trained matching model in 2050. On the other hand, in response to the determination that the updated sample result still does not satisfy the second preset condition, the processing engine 112 may still update the first updated matching model and the second updated matching model until the updated sample result satisfies the second preset condition.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing engine 112 may update the first trained matching model and/or the second trained matching model at a certain time interval (e.g., per month, per two months) based on a plurality of newly obtained historical transportation trip records.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with some embodiments is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system configured to provide Online-to-Offline services to interact with service requesters and service providers through order processing, comprising:
    at least one storage device including a set of instructions; and
    at least one processor in communication with the at least one storage device, wherein when executing the set of instructions, the at least one processor is configured to cause the system to:
        obtain first information associated with a first service request, wherein the first service request has been allocated to a service provider and has been accepted by the service provider, the first service request being initiated via an application executed by a first requester terminal;
        obtain, via a request receiving port, second information associated with a second service request, the second service request being initiated via an application executed by a second requester terminal;
        determine a matching parameter based on the first information and the second information by using at least one trained matching model, wherein the at least one trained matching model includes a first trained matching model and a second trained matching model, and to determine the matching parameter based on the first information and the second information by using the at least one trained matching model, the at least one processor is configured to cause the system further to:
            determine a first matching parameter based on the first information and the second information by using the first trained matching model;
            determine a second matching parameter based on the first information and the second information by using the second trained matching model;
            determine the matching parameter based on the first matching parameter and the second matching parameter;
        determine whether the matching parameter is larger than a threshold; and
        transmit, via a network, data associated with the second service request to a provider terminal associated with the service provider based on a result of the determination that the matching parameter is larger than the threshold, wherein the provider terminal, in response to receiving the data associated with the second service request, displays at least portion of the received data associated with the second service request in a graphic user interface.

2. The system of claim 1, wherein to determine the matching parameter based on the first information and the second information by using the at least one trained matching model, the at least one processor is configured to cause the system further to:
    obtain reference information associated with the service provider from a data resource via the network, the reference information including at least one of provider information associated with the service provider, weather information, time information, or traffic information; and
    determine the matching parameter based on the first information, the second information, and the reference information by using the at least one trained matching model.

3. The system of claim 1, wherein the first information includes at least one of a first start location of the first service request, a first destination of the first service request, or a first start time of the first service request; and the second information includes at least one of a second start location of the second service request, a second destination of the second service request, or a second start time of the second service request.

4. The system of claim 1, wherein the at least one trained matching model is trained by the at least one processor based on a training process, the training process comprising:
    obtaining a plurality training samples including at least one positive training sample and at least one negative training sample;
    extracting feature information of each of the plurality of training samples; and
    determining the at least one trained matching model based on the feature information of the plurality of training samples, wherein obtaining the at least one positive training sample and the at least one negative training sample includes:
        obtaining a historical transportation service record, wherein the historical transportation service record includes first historical information associated with a first historical order that was accepted by a historical service provider, second historical information associated with a second historical order that was matched with the first historical order, or historical reference information associated with the historical service provider;
        determining a positive training sample based on the historical transportation service record based on a result of the determination that the second historical order was accepted by the historical service provider; and
        determining a negative training sample based on the historical transportation service record based on a result of the determination that the second historical order was not accepted by the historical service provider.

5. The system of claim 4, wherein the first historical information includes at least one of a first historical start location of the first historical order, a first historical destination of the first historical order, or a first historical start time of the first historical order; and the second historical information includes at least one of a second historical start location of the second historical order, a second historical destination of the second historical order, or a second historical start time of the second historical order.

6. The system of claim 4, wherein determining the at least one trained matching model based on the plurality of training samples includes:
    obtaining at least one preliminary matching model;
    determining a plurality of sample matching parameters corresponding to the plurality of training samples based on the at least one preliminary matching model and the feature information of the plurality of training samples;
    determining whether the plurality of sample matching parameters satisfy a first preset condition; and designating the at least one preliminary matching model as the at least one trained matching model based on a result of the determination that the plurality of sample matching parameters satisfy the first preset condition.

7. The system of claim 6, wherein determining the at least one trained matching model based on the plurality of training samples includes:
updating the at least one preliminary matching model based on a result of the determination that the plurality of sample matching parameters fail to satisfy the first preset condition.

8. The system of claim 4, wherein the at least one trained matching model includes a first trained matching model and a second trained matching model, and determining the at least one trained matching model based on the plurality of training samples includes:
obtaining a first preliminary matching model and a second preliminary matching model;
determining a plurality of first sample matching parameters corresponding to the plurality of training samples based on the first preliminary matching model and the feature information of the plurality of training samples;
determining a plurality of second sample matching parameters corresponding to the plurality of training samples based on the second preliminary matching model and the feature information of the plurality of training samples;
determining whether a sample result associated with the plurality of first sample matching parameters and the plurality of second sample matching parameters satisfies a second preset condition; and
respectively designating the first preliminary matching model and the second preliminary matching model as the first trained matching model and the second trained matching model based on a result of the determination that the sample result satisfies the second preset condition.

9. The system of claim 8, wherein determining the at least one trained matching model based on the plurality of training samples includes:
updating at least one of the first preliminary matching model and the second preliminary matching model based on a result of the determination that the sample result fails to satisfy the second preset condition.

10. The system of claim 4, wherein the feature information of the each of the plurality of training samples includes first feature information of the each of the plurality of training samples, second feature information of the each of the plurality of training samples, and third feature information of the each of the plurality of training samples, and determining the feature information of each of the plurality of training samples includes:
extracting initial feature information of the each of the plurality of training samples, the initial feature information including first initial feature information of a non-identity category and second initial feature information of an identity category; and
determining the feature information of the each of the plurality of training samples by modifying the initial feature information.

11. The system of claim 10, wherein determining the feature information of the each of the plurality of training samples by modifying the initial feature information includes:
determining a first feature result based on a trained integration model and the first initial feature information; and
determining the first feature information of the each of the plurality of training samples by normalizing the first feature result.

12. The system of claim 10, wherein determining the feature information of the each of the plurality of training samples by modifying the initial feature information includes:
determining the second feature information of the each of the plurality of training samples by normalizing the first initial feature information.

13. The system of claim 10, wherein determining the feature information of the each of the plurality of training samples by modifying the initial feature information includes:
discretizing the second initial feature information; and
determining the third feature information of the each of the plurality of training samples by normalizing the discretized second initial feature information.

14. The system of claim 1, wherein the at least one trained matching model includes an extreme gradient boosting model, a linear regression model, or a deep learning network model.

15. A method for providing Online-to-Offline services to interact with service requesters and service providers through order processing, implemented on a computing device having at least one processor, at least one storage device, and a communication platform connected to a network, the method comprising:
obtaining first information associated with a first service request, wherein the first service request has been allocated to a service provider and has been accepted by the service provider, the first service request being initiated via an application executed by a first requester terminal;
obtaining, via a request receiving port, second information associated with a second service request, the second service request being initiated via an application executed by a second requester terminal;
determining a matching parameter based on the first information and the second information by using at least one trained matching model, wherein the at least one trained matching model includes a first trained matching model and a second trained matching model, and the determining the matching parameter based on the first information and the second information by using the at least one trained matching model includes:
determining a first matching parameter based on the first information and the second information by using the first trained matching model;
determining a second matching parameter based on the first information and the second information by using the second trained matching model;
determining the matching parameter based on the first matching parameter and the second matching parameter;
determining whether the matching parameter is larger than a threshold; and
transmitting, via a network, data associated with the second service request to a provider terminal associated with the service provider based on a result of the determination that the matching parameter is larger than the threshold, wherein the provider terminal, in response to receiving the data associated with the second service request, displays at least portion of the received data associated with the second service request in a graphic user interface.

16. The method of claim 15, wherein determining the matching parameter based on the first information and the second information by using the at least one trained matching model includes:

obtaining reference information associated with the service provider from a data resource via the network, the reference information including at least one of provider information associated with the service provider, weather information, time information, or traffic information; and determining the matching parameter based on the first information, the second information, and the reference information by using the at least one trained matching model.

17. The method of claim 15, wherein the at least one trained matching model is trained by the at least one processor based on a training process, the training process comprising:

obtaining a plurality training samples including at least one positive training sample and at least one negative training sample;

extracting feature information of each of the plurality of training samples; and determining the at least one trained matching model based on the feature information of the plurality of training samples, wherein obtaining the at least one positive training sample and the at least one negative training sample includes:

obtaining a historical transportation service record, wherein the historical transportation service record includes first historical information associated with a first historical order that was accepted by a historical service provider, second historical information associated with a second historical order that was matched with the first historical order, or historical reference information associated with the historical service provider;

determining a positive training sample based on the historical transportation service record based on a result of the determination that the second historical order was accepted by the historical service provider; and determining a negative training sample based on the historical transportation service record based on a result of the determination that the second historical order was not accepted by the historical service provider.

18. A non-transitory computer readable medium, comprising executable instructions that, when executed by at least one processor, directs the at least one processor to perform a method, the method comprising:

obtaining first information associated with a first service request, wherein the first service request has been allocated to a service provider and has been accepted by the service provider, the first service request being initiated via an application executed by a first requester terminal;

obtaining, via a request receiving port, second information associated with a second service request, the second service request being initiated via an application executed by a second requester terminal;

determining a matching parameter based on the first information and the second information by using at least one trained matching model, wherein the at least one trained matching model including a first trained matching model and a second trained matching model; and determining the matching parameter based on the first information and the second information by using the at least one trained matching model, comprising:

determining a first matching parameter based on the first information and the second information by using the first trained matching model;

determining a second matching parameter based on the first information and the second information by using the second trained matching model;

determining the matching parameter based on the first matching parameter and the second matching parameter;

determining whether the matching parameter is larger than a threshold; and transmitting, via a network, data associated with the second service request to a provider terminal associated with the service provider based on a result of the determination that the matching parameter is larger than the threshold, wherein the provider terminal, in response to receiving the data associated with the second service request, displays at least portion of the received data associated with the second service request in a graphic user interface.

\* \* \* \* \*